(12) United States Patent
Irisawa

(10) Patent No.: US 8,307,676 B2
(45) Date of Patent: Nov. 13, 2012

(54) OPENABLE AND CLOSABLE TWO-PRONGED BODY HOLDING DEVICE

(75) Inventor: Hideaki Irisawa, Ota-ku (JP)

(73) Assignee: Sanriki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/737,478

(22) PCT Filed: Jan. 27, 2010

(86) PCT No.: PCT/JP2010/051014
§ 371 (c)(1),
(2), (4) Date: Jan. 14, 2011

(87) PCT Pub. No.: WO2010/087357
PCT Pub. Date: Aug. 5, 2010

(65) Prior Publication Data
US 2011/0126597 A1    Jun. 2, 2011

(30) Foreign Application Priority Data

Jan. 28, 2009   (JP) ................................ 2009-016867

(51) Int. Cl.
E05B 75/00    (2006.01)
(52) U.S. Cl. .................... 70/16; 70/15; 70/17; 128/846; 128/869; 128/878; 128/879; 128/882
(58) Field of Classification Search ................ 70/15–17; 128/846, 869, 878, 879, 882
See application file for complete search history.

(56) References Cited

U.S. PATENT DOCUMENTS

| 491,642 | A | * | 2/1893 | Griffith | 119/806 |
| 636,439 | A | * | 11/1899 | Maltby | 70/17 |
| 691,941 | A | * | 1/1902 | Headson | 70/17 |
| 885,811 | A | * | 4/1908 | Ward | 70/17 |
| 1,112,867 | A | * | 10/1914 | Taylor | 119/806 |
| 1,116,329 | A | * | 11/1914 | Russell | 70/16 |
| 1,197,549 | A | * | 9/1916 | Russell | 70/17 |
| 1,317,424 | A | * | 9/1919 | Bowman | 70/17 |
| 1,719,698 | A | * | 7/1929 | Gross | 70/17 |
| 2,383,077 | A | * | 8/1945 | Powell | 70/17 |
| 2,949,761 | A | * | 8/1960 | Mitchell et al. | 70/16 |
| 5,460,373 | A | * | 10/1995 | McNutt | 463/47.2 |
| 5,482,271 | A | * | 1/1996 | McNutt | 119/808 |
| 2007/0000451 | A1 | | 1/2007 | Goto | |

FOREIGN PATENT DOCUMENTS

| JP | 2000-230800 | 8/2000 |
| JP | 2003-254697 | 9/2003 |
| JP | 2005-291603 A | 10/2005 |
| JP | 2007-71525 | 3/2007 |
| JP | 2007-278685 | 10/2007 |
| JP | 3136764 U | 11/2007 |

* cited by examiner

Primary Examiner — Suzanne Barrett
Assistant Examiner — Ifeolu Adeboyejo
(74) Attorney, Agent, or Firm — Masuvalley & Partners

(57) ABSTRACT

A two-pronged body restraining device includes a restraint unit provided at one end of an operating rod and a lock unit provided at the other end within the operating rod. The restraint unit includes a pair of griping members pivotably attached to a supporting member secured to the front end of a sliding bar. The sliding bar is slidably inserted into the operating rod and a pair of swinging plates, which are pivotably attached to a supporting element in which the sliding bar is slidably inserted. The lock unit is comprised of a rack-type engagement portion having saw-toothed projections, and a locking portion having a locking piece to be engaged with the rack-type engagement portion. The lock unit is configured to slide the sliding member only toward the rear end of the operating rod causing the pair of griping members to be closed when the supporting member is moved backwardly.

20 Claims, 14 Drawing Sheets (a)　　　　　　　　　(b)

ically, as a crime prevention device or an arrest-
OPENABLE AND CLOSABLE TWO-PRONGED BODY HOLDING DEVICE This application is a National Stage application under 35 U.S.C. §371 of International Application Serial No. PCT/JP2010/051014, filed on Jan. 27, 2010, and claims the priority benefit under 35 U.S.C. §119 of Japanese Patent Application No. 2009-016867, filed Jan. 28, 2009, which are hereby expressly incorporated by reference in their entirety for all purposes.

TECHNICAL FIELD

The present invention relates to a body restraining device. More specifically, it relates to an openable and closable two-pronged body restraining device that can protect a user from attacks threatening his/her life or body by a criminal, an attacker, or the like. The body restraining device can restrain a leg or an arm of the criminal or the like to deprive him/her of the ability to move, thereby preventing the criminal from fighting back or fleeing.

BACKGROUND OF THE INVENTION

Conventionally, as a crime prevention device or an arresting tool for restraining an attacker possessing cutlery while protecting a user him/herself from attacks, a two-pronged fork has been used. Furthermore, a police officer uses handcuffs for capturing and arresting a criminal. The two-pronged fork, which has been used since the Edo era, has a two-pronged curved pressing metal piece attached to a front end of a long handle, and is used as a crime prevention device for pressing with the two-pronged part an attacker or the like who is vigorously fighting back against a wall or a floor to thereby arrest the attacker.

As such a two-pronged fork, for example Japanese Patent Application Laid-Open No. 2000-230800 discloses a "two-pronged fork-type arresting tool", and Japanese Patent Application Laid-Open No. 2003-254697 discloses a "two-pronged fork". The "two-pronged fork-type arresting tool" disclosed in the above documents are both configured such that the front ends of the two-pronged pressing part are movable to approach each other to attain a closed state, to thereby deprive the attacker of the ability to move freely.

The "two-pronged fork-type arresting tool" disclosed in Japanese Patent Application Laid-Open No. 2000-230800 has a sliding body provided at the center of a pressing part having left and right prongs, and the sliding body protrudes when the pressing part is open. According to this "two-pronged fork-type arresting tool", when the sliding body is pressed by the body of an attacker or the like, the pressing part is closed to prevent the attacker or the like from escaping freely. The "two-pronged fork" disclosed in Japanese Patent Application Laid-Open No. 2003-254697 includes a pressing part having left and right prongs fixedly secured to an end of a supporting member, and a pneumatic cylinder attached to the middle part on the near side of the pressing part. According to this "two-pronged fork", when a user manually operates an operating lever, the pneumatic cylinder is activated to thereby close the left and right prongs of the pressing part.

The "two-pronged fork-type arresting tool" and the "two-pronged fork" disclosed in the above Japanese Patent Applications are both configured to close around the body of an attacker or the like to thereby deprive the attacker of freedom of movement. Thus, the pressing part is large in size and difficult for a user to operate. Further, the body of the attacker who is vigorously fighting back is not maintained at a constant angle, and thus, even when a user tries to arrest the attacker by holding the long handle with both hands, the surrounding obstacles and clothes may hinder the user from closing the pressing part around the body of the attacker.

Furthermore, the two-pronged fork has the large pressing part with two prongs formed at a front end of the long handle, which is not only difficult to be loaded on a patrol car but also difficult for carrying or storing. The two-pronged fork with a long handle is unsuitable for quick response. Moreover, as the two-pronged fork is intended to restrain the body, the restrained person can still move the hands and legs freely even if he/she is deprived of freedom of action. Therefore, in the case where the attacker or the like possesses a deadly weapon like cutlery, the user cannot easily approach the attacker to arrest him/her. The user may need another person's help so as to completely restrain the attacker by depriving him/her of the ability to move the hands and legs.

Handcuffs are also used as means for restraining the wrists to deprive a person of the ability to move the arms. The user, however, may be attacked by an attacker or the like until the attacker is handcuffed. For using the handcuffs, it is necessary to restrain the body of the attacker or the like first to deprive him/her of freedom of action.

As described above, the two-pronged fork and the handcuffs each have both merits and demerits, and both cannot promptly respond to a crime at the scene. The present invention has been accomplished to solve the above-described problems, and an object of the present invention is to provide an openable and closable two-pronged body restraining device which allows a user to readily arrest an attacker or the like by restraining his/her hand or leg while preventing the user from being physically harmed thereby.

SUMMARY OF THE INVENTION

To achieve the above-described object, the present invention is configured as follows. An openable and closable two-pronged body restraining device according to the present invention includes a restraint unit provided at one end of an operating rod and a lock unit provided on the operating rod.

The restraint unit includes a pair of gripping members independent from each other and each having a curved inner surface, the gripping members being fixedly secured to a front end of a sliding bar slidably inserted in the operating rod. The sliding bar is slidably inserted through a supporting portion which is fixedly secured to a front end of the operating rod. The supporting portion has respective ends to which swinging plates are pivotally attached, and the swinging plates have other ends pivotally attached to the respective gripping members.

The lock unit includes a rack-type engagement portion having saw-toothed projections formed on a sliding member fixedly secured to the sliding bar, and a locking portion having a locking piece to be engaged with the rack-type engagement portion. The lock unit is configured such that when the rack-type engagement portion and the locking piece are engaged with each other, the sliding member is allowed to slide only in a direction toward a rear end of the operating rod and not in a direction toward the restraint unit.

The device is configured such that when the sliding member and the sliding bar slide in the direction toward the rear end of the operating rod to thereby cause the supporting member to retract, the pair of gripping members are closed.

The pair of gripping members may each have a guide roller attached to a front end thereof for guiding a hand or a leg inward, or may each be provided with a through hole for the purposes of weight reduction. Furthermore, although it is preferable that the both gripping members are pivotally attached to the supporting member which is fixedly secured to the front end of the sliding bar, only one of the gripping members may be pivotally attached to the supporting member so as to be openable and closable.

The sliding member may be formed such that it is biased toward the rear end portion of the operating rod, or toward the restraint unit, by a spring provided in the operating rod. In the case where the spring for biasing the sliding member toward the rear end portion of the operating rod is provided, the pair of gripping members can be closed quickly, while in the case where the spring for biasing the sliding member toward the restraint unit is provided, the pair of gripping members can be opened quickly. Furthermore, in the case where the spring for biasing the sliding member toward the rear end portion of the operating rod is provided, the operating rod is preferably provided with a spring pressure holding unit which is made up of a locking hole provided on the sliding member and a pawl which is freely retractably inserted into the locking hole, so as to hold the pair of gripping members in the open state.

Moreover, the operating rod and the sliding member inserted in the operating rod may be configured to be extendable. In the state where the pair of gripping members are open, the sliding member is biased toward the rear end side of the operating rod by the sliding bar arranged in the operating rod or by a spring attached to the sliding member. Furthermore, in the case where the spring for biasing the sliding member toward the restraint unit is provided, the operating rod may be provided with an operation unit. This operation unit allows a user to forcibly pull the sliding member toward the rear end side of the operating rod so as to cause the supporting member to retract to thereby close the gripping members.

Furthermore, the supporting member and the sliding bar may be pivotally connected to each other and the swinging plates may be formed of flexible members, so as to cause an angle between the gripping members and the operating rod to be changeable.

The openable and closable two-pronged body restraining device according to the present invention allows a user to operate it with one hand, and also allows the user to restrain the body of an attacker or the like who is vigorously fighting back, while ensuring the safety of the user him/herself. The device can also be used for self-defense, like a truncheon, and can be loaded on a patrol car or the like because of its compactness, thereby allowing the user to act according to circumstances.

Furthermore, once the gripping members are closed, they would not open until the locked state is released, as in the case of the handcuffs, whereby the device can deprive a person of freedom of action continuously.

DETAILED DESCRIPTION OF THE INVENTION

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims.

Figure 1:
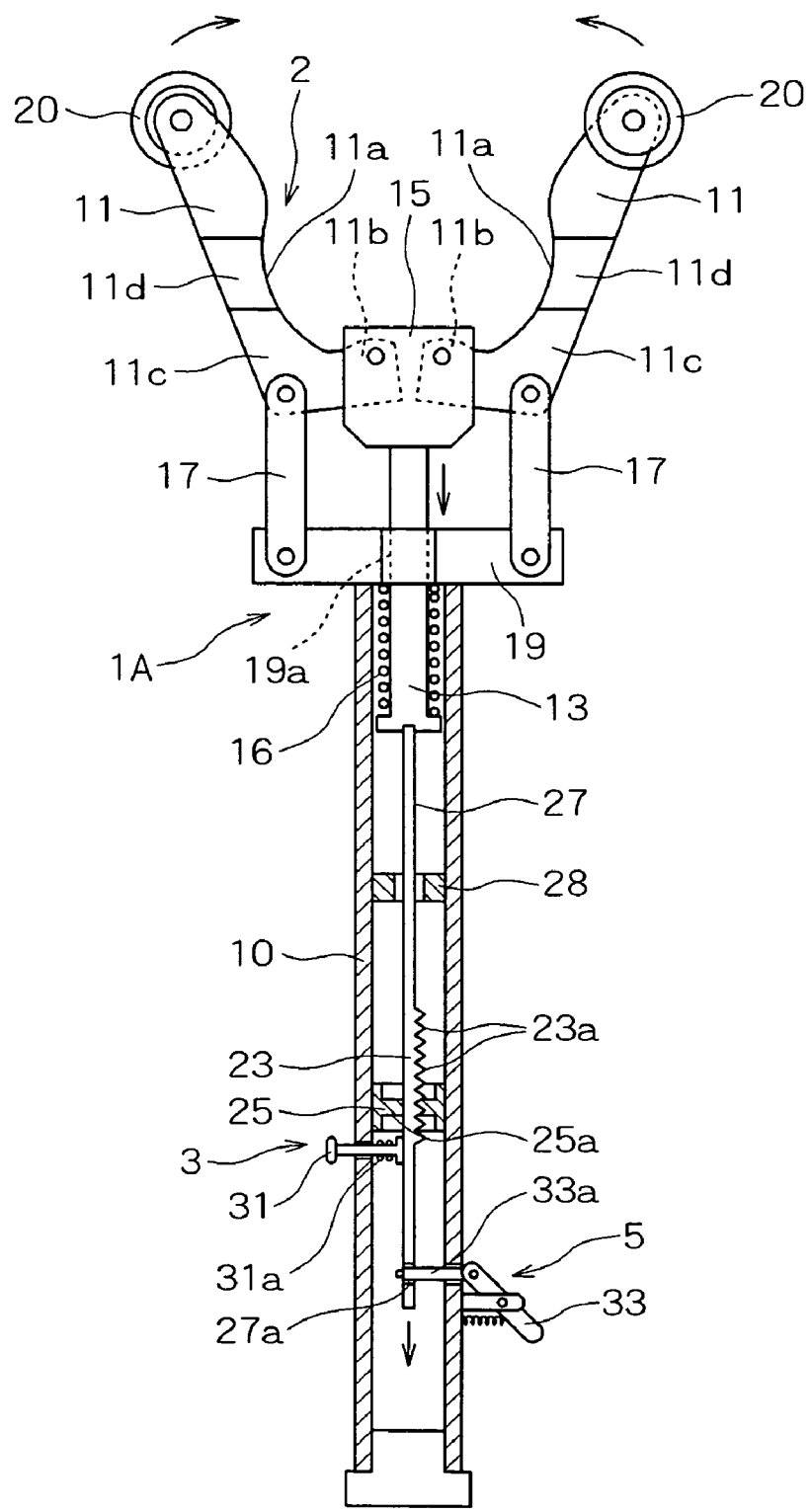
FIG. 1 is a partially sectional plan view of a body restraining device according to a first embodiment of the present invention.

Hereinafter, specific embodiments of the openable and closable two-pronged body restraining device of the present invention will be described with reference to the drawings. Referring first to FIG. 1, a partially sectional plan view of an embodiment of an openable and closable two-pronged body restraining device (hereinafter, simply referred to as the "body restraining device") is shown.

As shown in this figure, the body restraining device 1A includes a restraint unit 2, a lock unit 3, and a spring pressure holding unit 5. The restraint unit 2 further includes a pair of gripping members 11, which are independent from each other and are openable and closable. The lock unit 3 is configured to lock the restraint unit 2 when the same is closed. On the other hand, the spring pressure holding unit 5 is configured to keep gripping members of the restraint unit 2 in an open state. The restraint unit 2 is provided at one end of a tubular operating rod 10, while the lock unit 3 and the spring pressure holding unit 5 are formed at the other end, within the operating rod 10

More specifically, the gripping members 11 are each formed to have an approximately L shape in two dimensions, and each have a curved surface 11a on its inner side so as to be able to restrain an attacker by catching his/her body, particularly the hand or the leg, therebetween. Further, the gripping members 11 each have an inner end portion 11b pivotally attached to a supporting member 15 that is fixedly secured to a front end portion of a sliding bar 13. The sliding bar 13 has its rear end slidably inserted in the operating rod 10. The gripping members 11 each have an outer angular portion 11c pivotally attached to one end of a corresponding swinging plate 17.

Each swinging plate 17 has its other end pivotally attached to a corresponding end of a supporting element 19 that is attached to the front end of the operating rod 10. As a result, when the supporting member 15 retracts to approach the supporting element 19 side, the swinging plates 17 cause the outer angular portions 11c of the gripping members 11 to rotate outward, whereby the front end portions of the gripping members 11 are closed. As the gripping members 11 are closed, the curved surfaces 11a form a gap, in which the hand or the leg can be caught.

Figure 2:
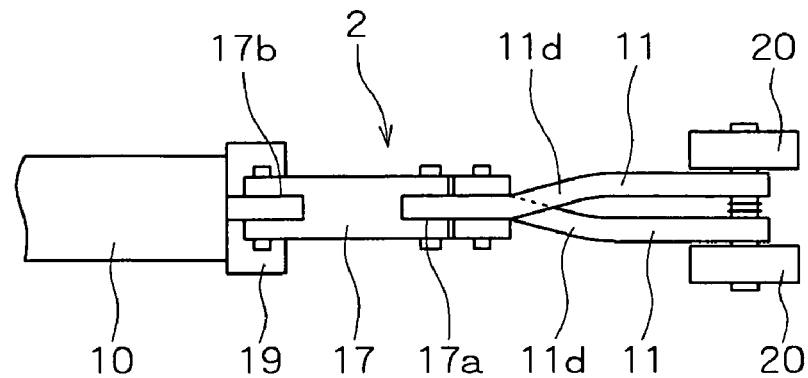
FIG. 2 is a side view of a restraint unit shown in FIG. 1.
Figure 4:
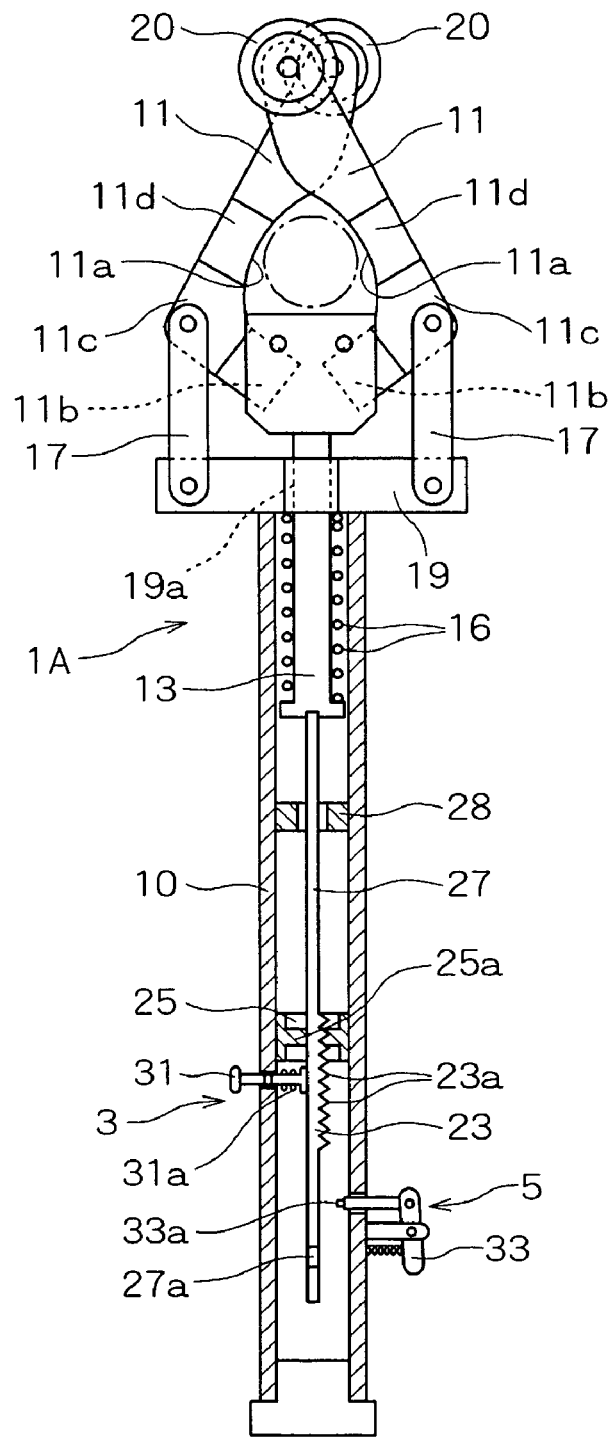
FIG. 4 is a partially sectional plan view of the body restraining device of the first embodiment in a closed state.

The gripping members 11 will now be described in more detail with reference to FIG. 4. The gripping members 11 each have a bent portion 11d in the middle way thereof, so as to allow the front end portions to cross each other when the gripping members 11 are closed. By forming the bent portions 11d, the portions closer to the front ends than the bent portions 11d cross over each other, as shown in FIG. 2. The gripping members 11 have the curved surfaces 11a and also have the bent portions 11d to allow them to cross over each other. As a result, the gap formed by the curved surfaces 11a when the gripping members 11 are closed can be made to gradually decrease in size, so as to match the size of a hand or a leg.

At the front end portion of each gripping member 11, a guide roller 20, as a guide member, is attached so as to facilitate insertion of a hand or a leg. Each guide roller 20 is preferably a roller provided with a one-way backstop which can rotate only inward, not outward. As the guide rollers 20 are for guiding the hand or the leg into the space formed by the gripping members 11, the guide rollers 20 are attached to the front end portions of the gripping members 11 to face opposite directions from each other.

The guide rollers 20 do not necessarily have to be provided, or they may be replaced with another type of guide members. For example, guide plates which are open outward may be attached to the front end portions of the gripping members 11, or the front end portions may simply have tapered surfaces.

Figure 3:
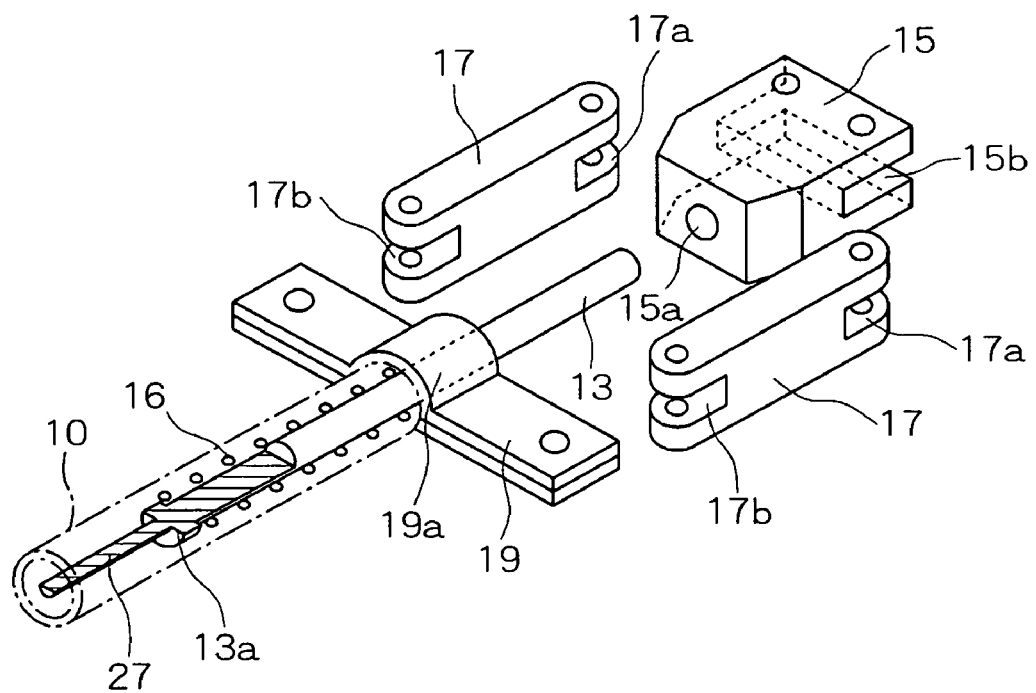
FIG. 3 is an exploded perspective view showing a part of the restraint unit.

The sliding bar 13, the supporting member 15, the swinging plates 17, and the supporting element 19 will now be described in more detail with reference to FIG. 3. The sliding bar 13 is slidably inserted into the operating rod 10 via a tubular portion 19a of the supporting element 19, and has its front end fixedly secured to the supporting member 15. The front end portion of the sliding bar 13 is fixedly secured to the supporting member 15 in the state where it protrudes from the supporting element 19 by means of a compressed coil spring 16 that is arranged inside the operating rod 10. The supporting element 19 is fixedly secured to the operating rod 10.

The supporting member 15 has a fitting hole 15a on its rear end surface for fixedly securing the sliding bar 13, and also has a concave portion 15b into which the inner end portions 11b of the gripping members 11 are inserted. Specifically, the inner end portions 11b of the gripping members 11 are inserted into the concave portion 15b to be pivotally secured thereto. The swinging plates 17 each have concave portions 17a and 17b formed at its respective ends into which the gripping member 11 and the supporting element 19 are inserted. The gripping member 11 and the supporting element 19 are pivotally secured to the concave portions 17a and 17b, respectively.

The sliding bar 13 has a protrusion 13a formed at its end, and the compressed coil spring 16 is mounted between the protrusion 13a and the supporting portion 19. The compressed coil spring 16 functions to bias the sliding bar 13 toward the lock unit 3 and the spring pressure holding unit 5.

When the gripping members 11 in the restraint unit 2 open, the sliding bar 13 fixedly secured to the supporting member 15 is pulled out, causing the compressed coil spring 16 to be compressed. In contrast, when the compressed coil spring 16 is released, the biasing force of the compressed coil spring 16 causes the sliding bar 13 and the supporting member 15 to retract. The swinging plates 17, however, prevent the gripping members 11 from retracting. Accordingly, the gripping members 11 each pivot about the inner end portion 11b, so that the guide roller 20 sides of the gripping members 11 are closed. At this time, as the respective ends of the swinging plates 17 are pivotally secured, the outer angular portions 11c of the gripping members 11 rotate outward together with the swinging plates 17, ensuring smooth closing of the gripping members 11.

In the above embodiment, the bent portions 11d have been formed in the gripping members 11 so as to allow the gripping members 11 to cross over each other. Alternatively, in order to cause the gripping members 11 to cross over each other, the gripping members 11 may be attached to the supporting member 15 one above the other from the beginning, without forming the bent portions 11d. When the gripping members 11 are attached in such a manner that they cross over each other, the gap created thereby can be made to gradually decrease in size.

In an alternative embodiment, the gripping members 11 may be simply made to abut against each other, instead of crossing over each other, or may be made to come close to each other. Furthermore, the gripping members 11 may each be in any shape as long as a gap is created internally when the gripping members 11 are closed. The shape of the gripping members 11 is not particularly restricted; it may be in an approximately L shape as shown in FIG. 1, or may be in a generally curved shape as will be described later.

In what follows, the lock unit 3 will be described in detail. The lock unit 3 is a mechanism for locking the gripping members 11 of the restraint unit 2 in the closed state. As shown in FIG. 1, the lock unit 3 is made up of a rack-type engagement portion 23 having saw-toothed projections 23a and an annular locking portion 25 having a locking piece 25a protruding from its inner surface. The rack-type engagement portion 23 is formed in a rear end portion of a sliding member 27 that is fixedly secured to the rear end portion of the sliding bar 13, and the annular locking portion 25 is fitted on the inner surface of the operating rod 10.

The locking piece 25a in the locking portion 25 engages with a saw-toothed projection 23a in the rack-type engagement portion 23. The locking piece 25a is configured such that, in the case where the compressed coil spring 16 is being compressed, the locking piece 25a engages with a saw-toothed projection 23a on the spring pressure holding unit 5 side. In the case where the compressed coil spring 16 is released, the locking piece 25a engages with a saw-toothed projection 23a on the sliding bar 13 side. The sliding member 27 is slidably inserted through a support ring 28 that is arranged inside the operating rod 10. The sliding member 27 and the sliding bar 13 move forward and backward in an integrated manner.

In the vicinity of the rack-type engagement portion 23 and the tubular locking portion 25, a pressing member 31 is provided which presses the rack-type engagement portion 23 against the locking portion 25. The pressing member 31 has a pressure spring 31a provided on the inner surface side of the operating rod 10. With this spring, the tip end portion of the pressing member 31 presses the rack-type engagement portion 23.

The locking piece 25a and the saw-toothed projections 23a each have an inclined plane only on one side as is a saw tooth, so that the sliding bar 13 and the sliding member 27 are generally prevented from sliding in the direction of the restraint unit 2 as long as the locking piece 25a is engaged with a saw-toothed projection 23a by the pressing member 31. In this manner, as soon as the gripping members 11 are closed, the closed state of the gripping members 11 is locked by the rack-type engagement portion 23 and the locking portion 25, thereby enabling the device to serve like a handcuff to restrain a hand or a leg of an attacker.

On the other hand, when the pressing member 31 is pulled out to disengage the locking piece 25a from the saw-toothed projection 23a, the sliding bar 13 and the sliding member 27 can slide toward the restraint unit 2. This means that the gripping members 11 may be opened by releasing the engagement between the saw-toothed projection 23a and the locking piece 25a.

The sliding member 27 may be either a pole-like member or a plate-like member. In the case where the sliding member 27 is formed of a curved leaf spring, the rack-type engagement portion 23 may be provided on its curved outer surface. This can push the rack-type engagement portion 23 against the locking portion 25, in which case the pressing member 31 becomes unnecessary. In the case where the sliding member 27 is formed of a leaf spring as described above, in order to enable disengagement of the locking piece 25a from the saw-toothed projection 23a, the pressing member 31 may be provided on a side opposite to the side where it was provided in the above-described embodiment.

The spring pressure holding unit 5 will now be described. As shown in FIG. 1, the spring pressure holding unit 5 has a locking hole 27a formed at the rear end portion of the sliding member 27, and a press pin 33 attached to the rear end portion of the operating rod 10. The press pin 33 has an insert pin 33a which is configured to be inserted into the locking hole 27a. The press pin 33 is in an approximately dogleg shape as a whole, and is pivotally secured in such a manner that the insert pin 33a protruding into the operating rod 10 moves up and down.

In order to cause the insert pin 33a to be inserted into the locking hole 27a, the locking piece 25a may be disengaged from the saw-toothed projection 23a and then the locking hole 27a may be moved forward to the position of the insert pin 33a while compressing the compressed coil spring 16. When the insert pin 33a is inserted into the locking hole 27a, the compressed coil spring 16 is held in the compressed state, while the gripping members 11 are held in the open state. After the gripping members 11 are held in the open state, the pressing member 31 may be pressed down so as to engage the locking piece 25a with the saw-toothed projection 23a.

In order to close the gripping members 11, in contrast with the opening state, the insert pin 33a may be pulled out of the locking hole 27a. Then, the biasing force of the compressed coil spring 16 causes the sliding member 27 and the sliding bar 13 to swiftly slide toward the rear end, whereby the gripping members 11 are closed. When the gripping members 11 are closed, the closed state is locked by the lock unit 3, so that the hand or the leg is restrained reliably.

Figure 5:
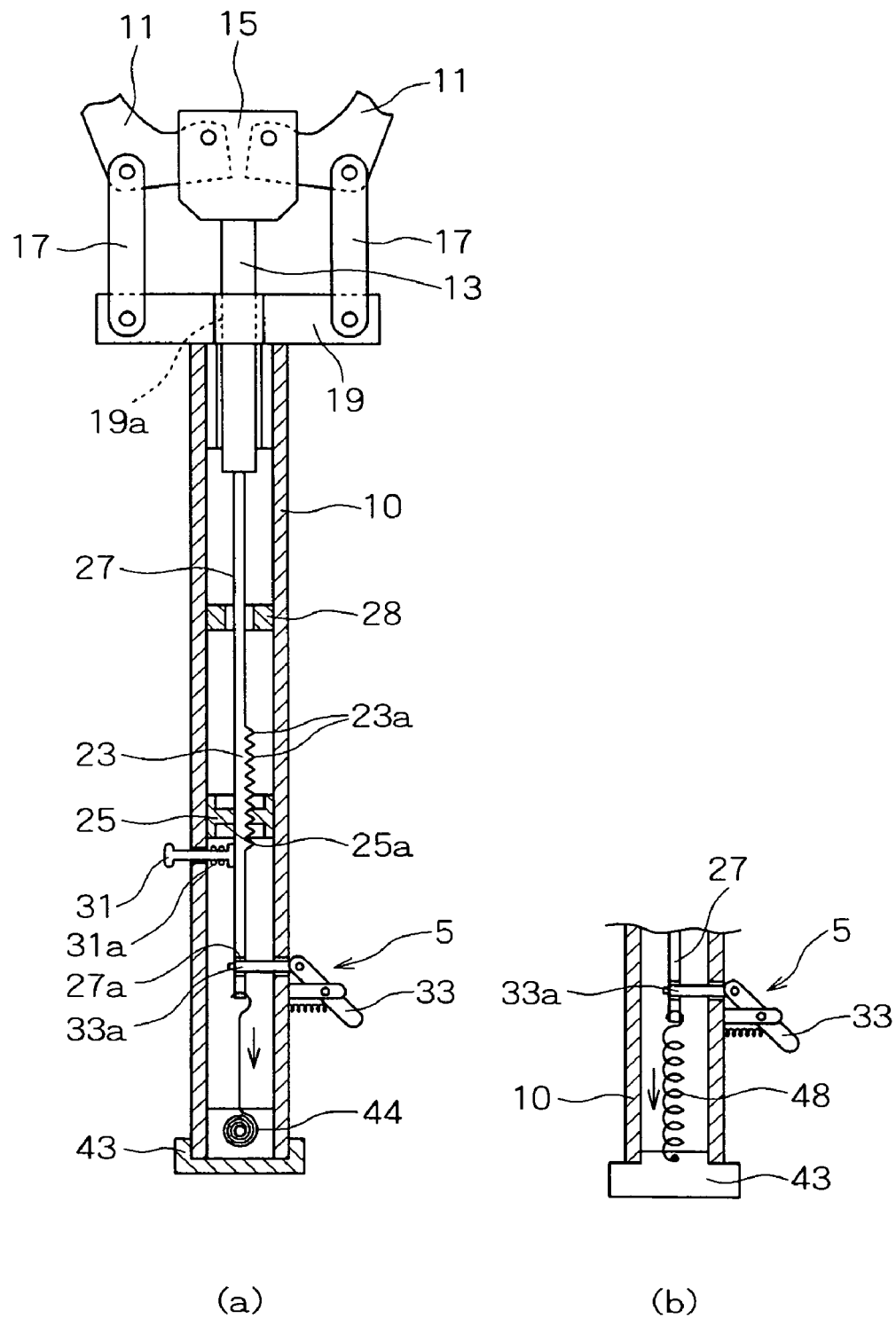
FIG. 5 is a plan view of a second embodiment with its main part shown in cross section.

Referring next to FIG. 5, an alternative embodiment, the second embodiment, of a body restraining device 1A is shown. The embodiment shown in FIG. 5 is identical to the above-described embodiment except that, while the compressed coil spring 16 has been used in the above-described embodiment, a tension spring is used in the second embodiment. Therefore, the like structures are denoted by the like reference characters, and description thereof will not be repeated. As shown in FIG. 5(a), a spiral spring 44 is arranged inside a cap 43 that is fitted with a rear end surface of the operating rod 10, and a front end of the spiral spring 44 is attached to the sliding member 27.

Accordingly, when the insert pin 33a is pulled out of the locking hole 27a, the sliding member 27 and the sliding bar 13 are attracted toward the cap 43 side, causing the gripping members 11 to be closed. Furthermore, in yet another alternative embodiment shown in FIG. 5(b), a tension coil spring 48 is used in place of the spiral spring 44. The tension coil spring 48 has one end attached to the cap 43 and the other end attached to the sliding member 27. The embodiments shown in FIG. 1 and FIG. 5 are identical in configuration except that they use different springs, i.e. the compressed coil spring 44 and the tension spring 48.

Figure 6:
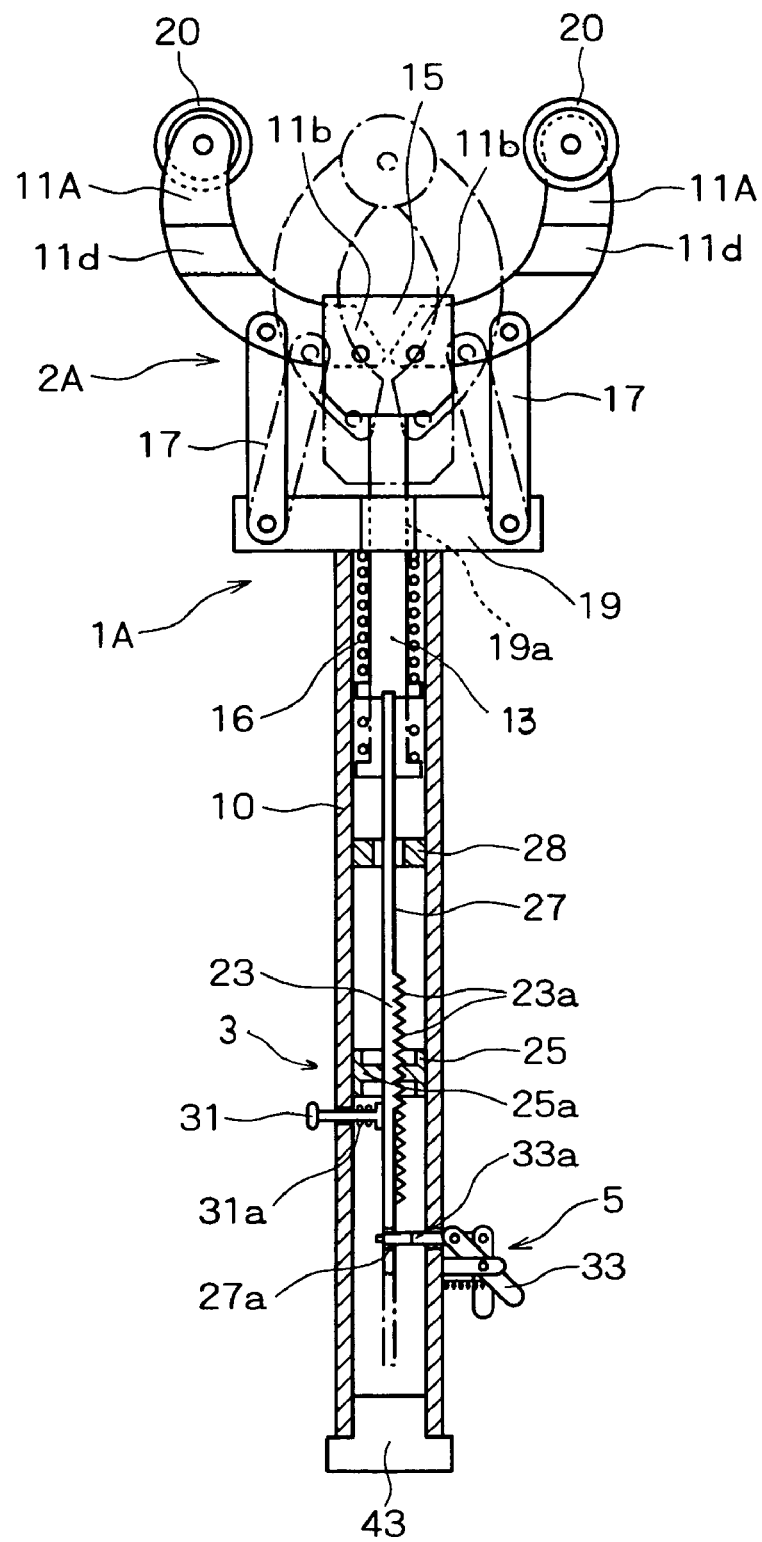
FIG. 6 is a plan view of a third embodiment with its main part shown in cross section.

With reference to FIG. 6, another alternative embodiment, the third embodiment, of a body restraining device 1A is shown. The embodiment shown in FIG. 6 is similar to the embodiment shown in FIG. 1 in that they both use the compressed coil spring 16. However, in the third embodiment, the compressed coil spring 16 pushes up the supporting portion 19 to thereby close the gripping members 11. In this embodiment, similar parts to those shown in FIG. 1 are denoted by the same reference characters, and therefore, description thereof will not be repeated.

In this embodiment, a restraint unit 2A has a pair of arc-shaped gripping members 11A which are independent from each other and are also openable and closable. When the gripping members 11A are closed, they form an approximately circular gap inside them, where the body of an attacker, particularly his/her hand or leg, can be restrained. As in the first embodiment, the gripping members 11A are pivotally attached to the supporting member 15 that is fixedly secured to a front end of the sliding bar 13, and are also pivotally attached to one ends of the swinging plates 17. The other ends of the swinging plates 17 are pivotally attached to the respective ends of the supporting element 19.

Here, unlike the above-described embodiments, the supporting element 19 is not fixedly secured to a front end of the operating rod 10, and therefore, they are separable from each other, although the sliding bar 13 is slidably inserted through the supporting portion 19. As a result, the compressed coil spring 16 functions to push up the supporting element 19. As the supporting element 19 is pushed up, the gripping members 11A are also pushed up via the swinging plates 17. At this time, as the inner end portions 11b of the gripping members 11A are pivotally attached to the supporting member 15, the gripping members 11A pivot about the inner end portions 11b, whereby the guide roller 20 sides are closed.

In this embodiment, it is also preferable that the gripping members 11A have bent portions 11d formed in the middle parts thereof, so that when the gripping members 11A are closed, their front end portions cross over each other, allowing the gap formed by the curved surfaces to be gradually reduced in size.

Figure 7:
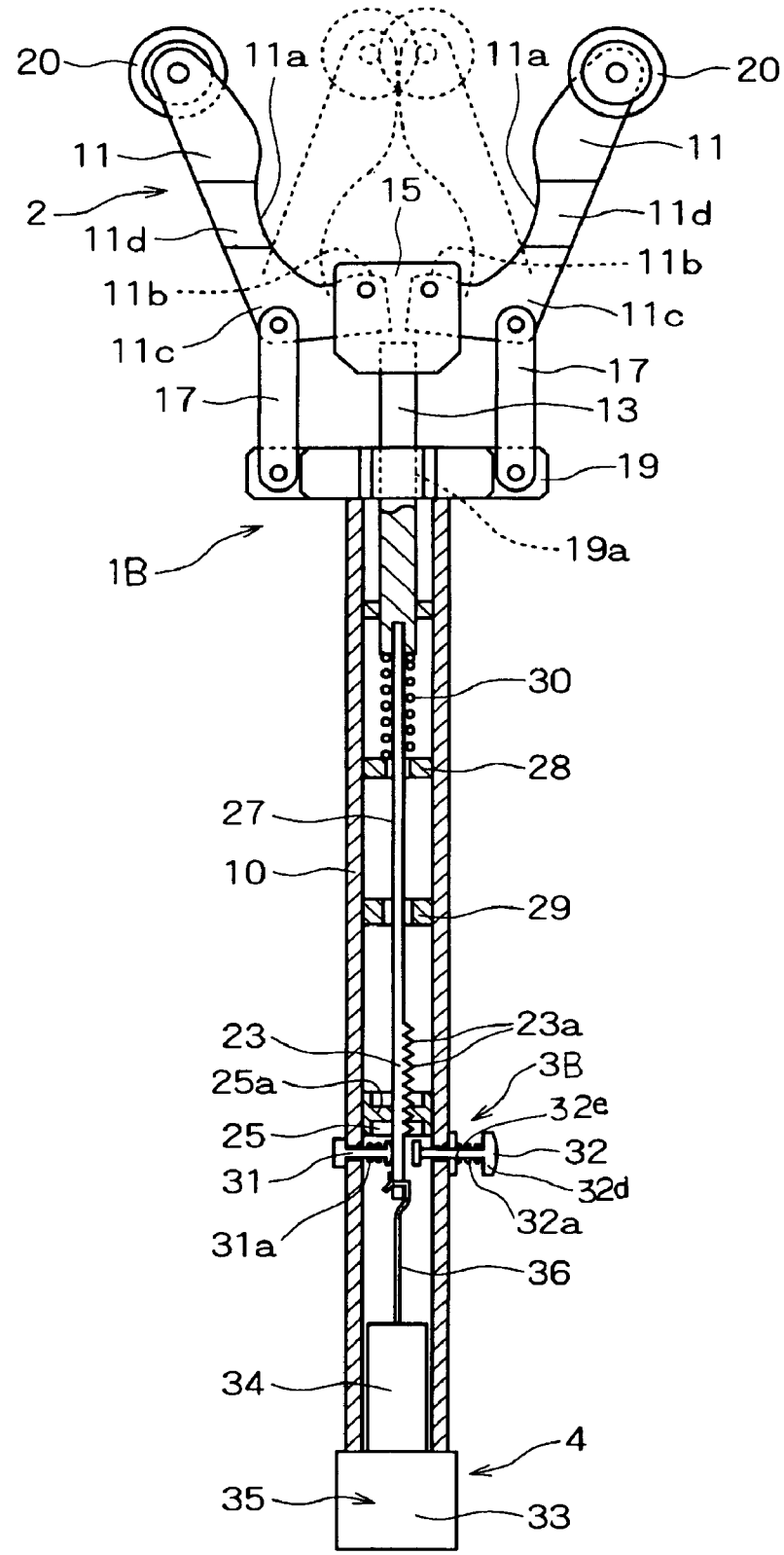
FIG. 7 is a plan view of a fourth embodiment with its main part shown in cross section.
Figure 8:
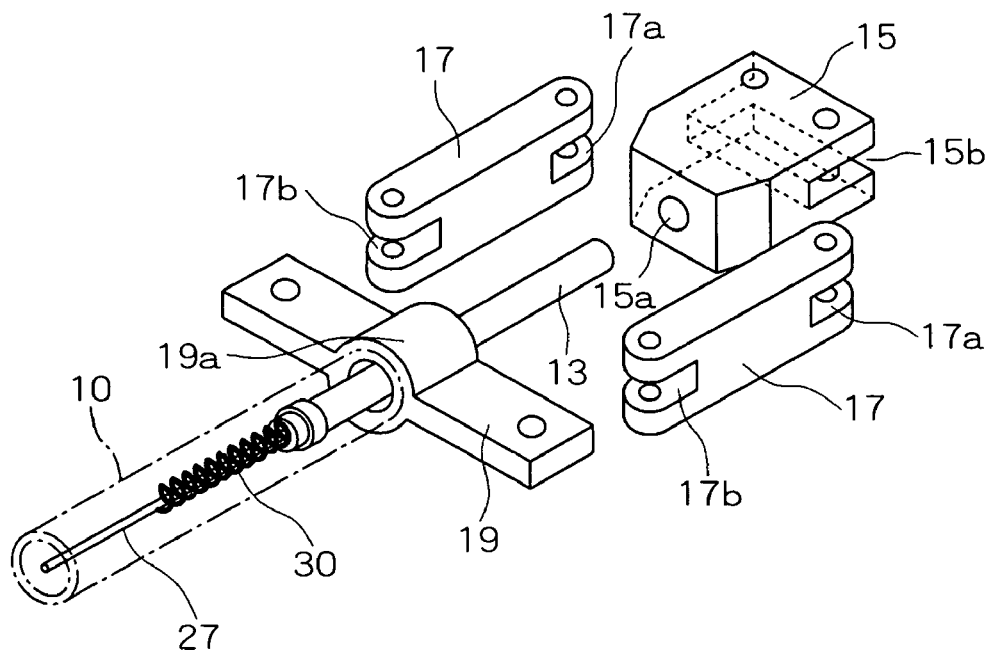
FIG. 8 is an exploded perspective view of the restraint unit, which is partially shown in cross section.

Referring next to FIGS. 7-8, another alternative embodiment, the fourth embodiment, of a body restraining device 1B is shown. In this embodiment, the body restraining device 1B made up of a restraint unit 2, a lock unit 3B which maintains the restraint unit 2 in a locked state, and an operation unit 4 which allows a user to manually close the restraint unit 2. The restraint unit 2 is provided at one end of a tubular operating rod 10, and the lock unit 3B and the operation unit 4 are formed on the operating rod 10. The restraint unit 2 is configured similar to those of the above embodiments. Thus, similar parts to those shown in previous embodiments are denoted by the same reference characters, and description thereof will not be repeated.

As shown in FIG. 7, the respective ends of the swinging plates 17 are pivotally attached to the gripping members 11 and the supporting portion 19. Therefore, in the state where the gripping members 11 are open, when the supporting member 15 is pressed to retract toward the operating rod 10 side, the swinging plates 17 prevent the gripping members 11 from moving backward, so that the gripping members 11 pivot about the inner end portions 1ib, whereby the guide roller 20 sides are closed. At this time, the swinging plates 17 and the outer angular portions 11c of the gripping members 11 pivot outward, enabling smooth opening/closing of the gripping members 11. Such opening/closing operations of the gripping members 11 are similar to those described in the previous embodiments.

In this embodiment, the gripping members 11 may also be provided with bent portions 11d in the middle parts thereof, so as to cause the gripping members 11 to cross over each other. In an alternative embodiment, the gripping members 11 may be pivotally attached to the supporting member 15 one above the other from the beginning. In yet another alternative embodiment, the gripping members 11 may be simply made to abut against each other, instead of crossing over each other, or may be made to come close to each other. The gripping members 11 may be of any shape as long as they have a gap inside them when they are closed; the shape of the gripping members 11 is not restricted to the one shown in this embodiment, as already explained in conjunction with the above-described embodiments.

In what follows, the lock unit 3B will be described in detail. The lock unit 3B is for locking the gripping members 11 in the restraint unit 2 in the closed state, similar to the lock unit 3 of FIG. 1. In the present embodiment, the sliding member 27 forming the rack-type engagement portion 23 in the lock unit 3B is slidably inserted through support rings 28, 29. Between the support rings 28 and the rear end surface of the sliding bar 13, a pressure spring 30 is attached to bias the sliding bar 13 toward the front end (i.e. toward the restraint unit 2). When the supporting member 15 is pushed forward together with the sliding bar 13 by the pressure spring 30, the gripping members 11 are opened by the swinging plates 17.

Furthermore, in the present embodiment, the lock unit 3B is provided with a press pin 32 to press down the rack-type engagement portion 23 against the pressing force of the pressing member 31. The press pin 32 is made up of a press-down portion 32d and an insert pin 32e, and the press-down portion 32d is biased in the direction away from the operating rod 10 by a spring 32a that is provided on an outer surface of the operating rod 10. When the press-down portion 32d is pressed down against the spring 32a, the locking portion 25 is disengaged from the rack-type engagement portion 23.

Moreover, in this embodiment, when the supporting member 15 is pressed in, the sliding bar 13 and the sliding member 27 move backward to thereby close the gripping members 11.

At the same time, the rack-type engagement portion 23 and the locking portion 25 lock the gripping members 11 in the closed state. That is, only pressing the device against the hand or the leg of an attacker can restrain the attacker, like the handcuff, so as to deprive him/her of freedom.

When the gripping members 11 are closed to a certain extent, they attain a locked state, and thereafter, the more the supporting member 15 is pressed in, the smaller the gap between the gripping members 11 becomes. This means that the more vigorously the attacker fights back, the more firmly will the attacker be restrained. Furthermore, if the attacker escapes from the restraint in the initial locked state, the press-down portion 32d may be pressed down so as to unlock the device with one-touch operation by the biasing force of the pressure spring 30, enabling a user to quickly move to the next action.

The operation unit 4 will now be described in detail. The operation unit 4, which also serves as a cap at the rear end surface of the operating rod 10, is configured to lock the gripping members 11 by pulling the rack-type engagement portion 23 of the lock unit 3B. More specifically, the operation unit 4 is made up of a cap 35 and a connecting element 36. The cap 35 has a grip portion 33 which is larger in diameter than the operating rod 10, and an insert portion 34 which is inserted into the operating rod 10. The insert portion 34 is connected with the rear end portion of the sliding member 27 via the connecting element 36.

The length of the connecting element 36 is adjusted such that the gripping members 11 are most widely opened when the insert portion 34 is inserted into the operating rod 10 and the grip portion 33 abuts against the end surface of the operating rod 10. As the cap 35 is connected to the sliding member 27 via the connecting element 36, when the grip portion 33 is pulled to cause the insert portion 34 to move backward, the sliding member 27 moves backward at the same time. Consequently, the gripping members 11 are closed, and simultaneously, the closed state is locked by the rack-type engagement portion 23 and the locking portion 25.

The operation unit 4 is effective in closing the gripping members 11 even in the case where the pressing of the supporting member 15 is insufficient. While the length of the operating rod 10 is not particularly restricted, it may be set such that a user can quickly move the device with one hand while avoiding the danger of being harmed by an attacker or the like. For example, the operating rod 10 may be formed to have a length equal to or slightly longer than that of a common truncheon.

Figure 9:
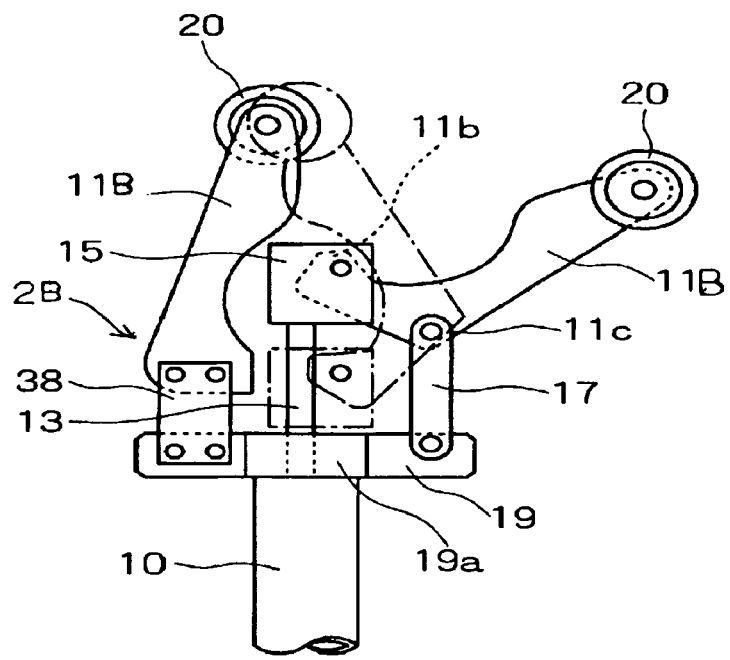
FIG. 9 is a plan view of a fifth embodiment of the restraint unit.

A restraint unit 2B according to a fifth embodiment of the present invention is shown in FIG. 9. As shown in this figure, one of gripping members 11 is fixedly secured, while the other is made openable and closable. Otherwise, the configuration of the present embodiment is identical to that of the previous embodiments shown in FIGS. 1-7.

The restraint unit 2B has gripping members 11B formed in approximately identical shapes, and one gripping member 11B (on the left side in FIG. 9) is fixedly secured in a closed state. More specifically, the one gripping member 11B is not pivotally attached to the supporting member 15, but is fixedly secured to one end of a fixed plate 38 having its other end fixedly secured to the supporting element 19. As a result, even when the supporting member 15 moves forward or backward, the fixedly secured gripping member 11B would not open or close.

The other gripping member 11B (on the right side in FIG. 9) has its inner end portion 11b pivotally attached to the supporting member 15 and its outer angular portion 11c pivotally connected to the swinging plate 17. Therefore, the other gripping member 11B opens and closes as the supporting member 15 moves forward and backward. In the present embodiment, the lock unit 3 and the operation unit 4 are configured similarly as in the fourth embodiment shown in FIG. 7, and thus, description thereof will not be repeated here.

Figure 10:
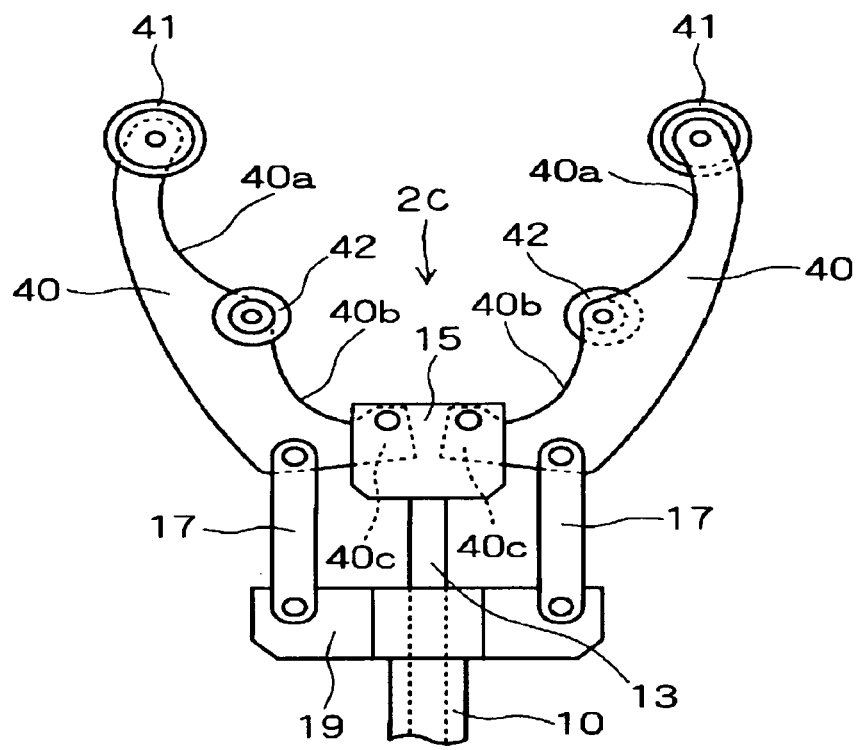
FIG. 10 is a plan view of a sixth embodiment of the restraint unit.

A restraint unit 2C according to a sixth embodiment of the present invention is shown in FIG. 10. The embodiment shown in FIG. 10 differs from the above-described embodiments in that two curved portions are formed in each of gripping members 40. More specifically, the gripping members 40 have curved surfaces 40a and curved surfaces 40b on the inner sides. Guide rollers 41 for guiding the hand or the leg inward are attached to the front ends of the gripping members 40. Similar guide rollers 42 are attached to protruding portions which define the boundaries between the curved surfaces 40a and 40b.

Preferably, each of the guide rollers 41 and 42 partially protrudes into the inner space created by the gripping members 40 and is provided with an anti-reverse-rotation mechanism. Furthermore, the gripping members 40 have their inner end portions 40c pivotally attached to the supporting member 15 that is fixedly secured to the front end portion of the sliding bar 13, and the sliding bar 13 is slidably inserted into the operating rod 10. The gripping members 40 have their outer edges pivotally attached to the swinging plates 17. The swinging plates 17 have their other end portions pivotally attached to the supporting element 19.

In a case where the gripping members 40 are provided with two curved surfaces 40a and 40b, as described above, for example an ankle may be gripped between the curved surfaces 40a to the front side, while a wrist may be gripped between the curved surfaces 40b on the supporting member 15 side, allowing the device to reliably restrain a site of the body as appropriate.

It should be noted that the guide rollers 41, 42 do not necessarily have to be provided, and that the gripping members 40 may be provided with bent portions 11a to allow them to cross over each other. The structures identical to those in the first and second embodiments are denoted by the like reference characters, and description thereof will not be repeated here.

Figure 11:
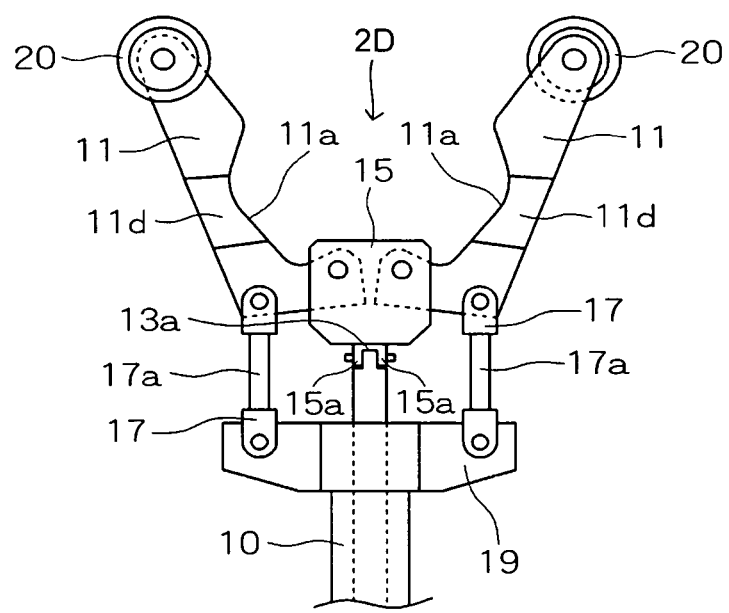
FIG. 11 is a plan view of a seventh embodiment of the restraint unit.
Figure 12:
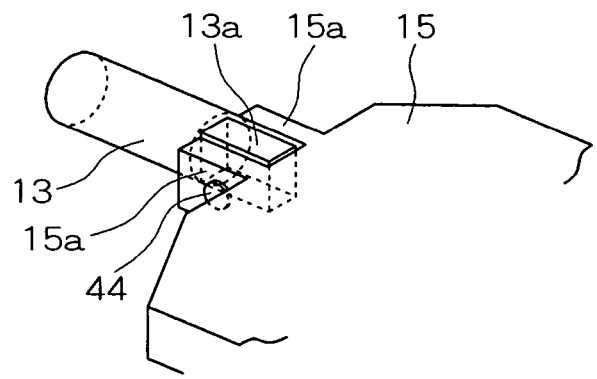
FIG. 12 is a perspective view illustrating that an angle between a sliding member and the restraint unit can be changed at their connecting portion.
Figure 13:
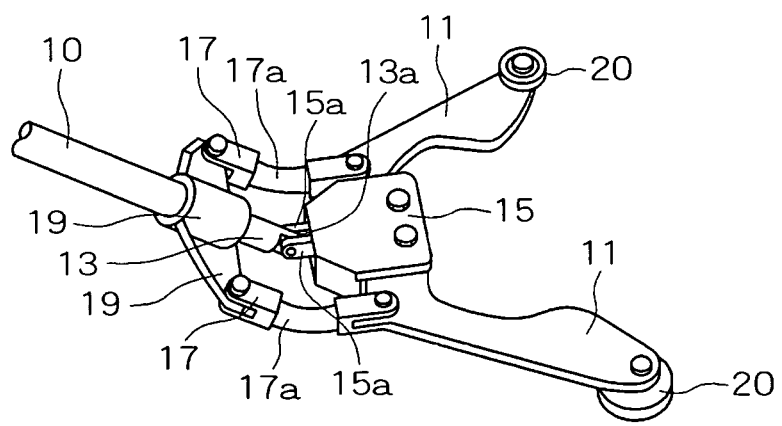
FIG. 13 is a perspective view illustrating the state where the angle of the gripping members has been changed.

With reference to FIGS. 11-13, a seventh embodiment of a restraint unit 2D is shown. In the first through sixth embodiments, the griping members 11 and 40 constituting the restraint units 2, 2A, 2B, and 2C are formed linearly and integrally with the operating rod 10, so that their directions cannot be changed. In contrast, according to the present embodiment, the angle between the operating rod 10 and the gripping members 11 can be changed, as apparent from FIG. 13. The present embodiment differs from the first through sixth embodiments described above in that the direction of the gripping members 11 can be changed.

In the seventh embodiment, the sliding bar 13 and the supporting member 15 are pivotally attached to each other. Specifically, a protruding portion 13a protruding from the front end of the sliding bar 13 is inserted between two gripping plates 15a protruding in parallel from the supporting member 15, and they are assembled with a pin 44 (see FIG. 12) in a pivotable manner. The swinging plates 17 supporting the gripping members 11 each have a middle part formed of a flexible member 17a having flexibility, which may be a coil spring, a leaf spring, a rubber member, or a resin member.

With the sliding bar 13 and the supporting member 15 pivotally attached to each other and with the flexible member 17a formed in the middle part of the swinging plate 17, the angle between the operating rod 10 and the gripping members 11 can be changed (see FIG. 13). As the gripping members 11 in the restraint unit 2D change in angle, even in a case where an attacker or the like vigorously fights back, the movements of the gripping members 11 can let the force escape, so that the gripping members 11 in the locked state would not harm the hand or the leg being restrained.

The configuration for enabling a change of the angle between the sliding bar 13 and the supporting member 15 is not restricted to the one in the present embodiment; the device may be configured arbitrarily. For example, a universal joint mechanism may be used in place of the connection by the gripping plates 15a and the protruding portion 13a.

Figure 14:
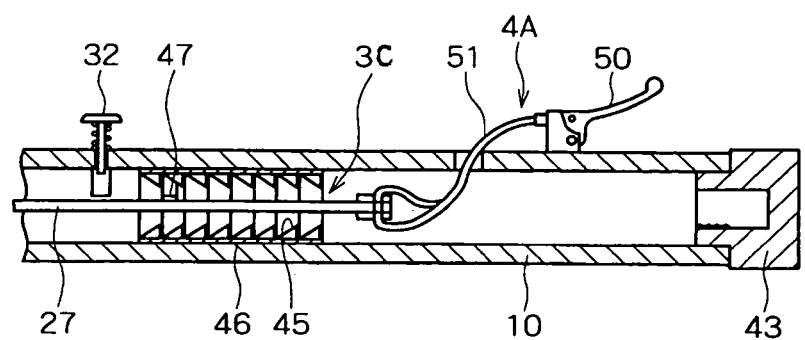
FIG. 14 is a cross-sectional view showing a lock unit and an operation unit according to the second embodiment of the present invention.

In the following, other embodiments of the lock unit 3 and the operation unit 4, shown in FIGS. 14-16 will be described in detail. FIG. 14 shows a second embodiment of the lock unit 3. In contrast to its first embodiment shown in FIGS. 1 and 7, the lock unit 3C includes a locking cylindrical body 46 provided with a plurality of saw-toothed projections 45, a locking piece 47 to be engaged with the saw-toothed projection 45, and a press pin 32 for releasing the engagement between the saw-toothed projection 45 and the locking piece 47. The locking cylindrical body 46 is in contact with the inner surface of the operating rod 10, and the locking piece 47 is provided at the rear end portion of the sliding member 27.

In the state where the locking piece 47 is engaged with the saw-toothed projection 45, although the locking piece 47 may slide toward the rear end of the operating rod 10, it cannot slide toward the restraint unit 2. Accordingly, the gripping members 11 in the restraint unit 2 are locked in the closed state. Depressing the press pin 32 releases the engaged state, enabling forward movement toward the restraint unit 2. The press pin 32 has its tip end protruding into the operating rod 10 to approach the sliding member 27. The press pin 32 is similar in configuration to the press pin 32 shown in FIG. 7, and thus, description thereof will not be repeated here.

FIG. 14 shows a second embodiment of the operation unit 4. The operation unit 4A has a lock lever 50, which is attached to an outer surface of the operating rod 10 and connected via a connecting element 51 to the sliding member 27. Thus, when a user holds and presses down the lock lever 50, the lock lever 50 pulls the sliding member 27 via the connecting element 51, causing the locking piece 47 to move backward while being engaged with the saw-toothed projections 45. The lock lever 50 can be used for quickly closing the gripping members 11, similar to the grip portion 34 according to the first embodiment of the present invention shown in FIG. 7.

The configuration of the restraint unit 2 is as described above, and the sliding member 27 is biased by the compressed coil spring 16 again as described above. Accordingly, when the press pin 32 is pressed down to release the engagement between the saw-toothed projection 45 and the locking piece 47, the sliding member 27 moves forward to thereby open the gripping members 11.

Figure 15:
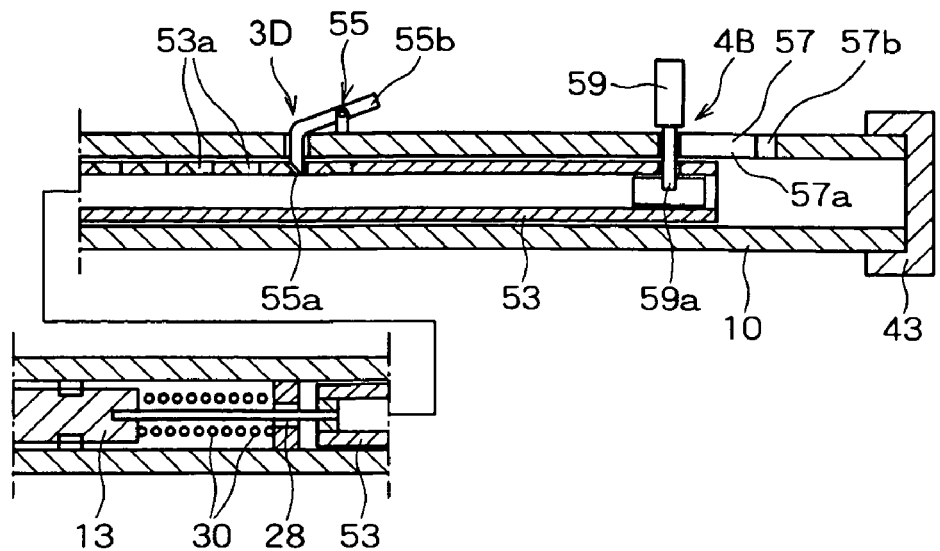
FIG. 15 is a cross-sectional view showing the lock unit and the operation unit according to the third embodiment of the present invention.
Figure 16:
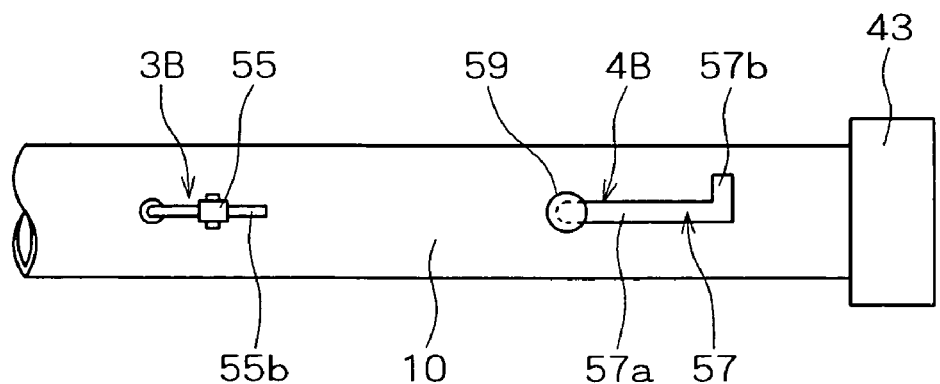
FIG. 16 is a plan view showing the third embodiments of the lock unit and the operation unit according to the fourth embodiment of the present invention.

Third embodiments of the lock unit 3D and the operation unit 4B are shown in FIGS. 15-16. As shown in these figures, the lock unit 3D may be configured as follows: A sliding tube 53 configured to slide inside the operating rod 10 is connected to the sliding member 27, and a large number of locking holes 53a are formed on the sliding tube 53 in its axial direction. A press pin 55 is attached to the operating rod 10, and an insert portion 55a of the press pin 55 is fitted in the locking hole 53a.

The press pin 55 has a press-down portion 55b and the insert portion 55a formed into an approximately dogleg shape as a whole. The press pin 55 is formed such that the insert portion 55a protruding into the operating rod 10 moves up and down. A tip end of the insert portion 55a is provided with an inclined plane facing the front end direction of the operating rod 10 (or, the restraint unit 2 direction). Each locking hole 53a also has an inclined plane facing the front end direction (or, the restraint unit 2 direction). Therefore, as the sliding tube 53 retracts, the inclined plane of the insert portion 55a abuts against the inclined plane of the locking hole 53a, thereby allowing the sliding tube 53 to slide smoothly. The engaged state of the insert portion 55a with the locking hole 53a prevents the sliding tube 53 from sliding toward the front end of the operating rod 10 (or, toward the restraint unit 2).

The inclined planes of the insert portion 55a and the locking holes 53a enable only the backward movement. In order to release the engaged state between the insert portion 55a and the locking hole 53a, the press-down portion 55b of the press pin 55 may be pressed down at is rear end so as to pull up the insert portion 55a. With the biasing force of the pressure spring 30, the sliding tube 53 moves forward, thereby opening the gripping members 11.

The operation unit 4B according to its third embodiment is configured as follows: A lock lever 59 is slidably inserted into an approximately L-shaped slit 57 provided on the operating rod 10. The lock lever 59 has a tip end 59a which protrudes into the operating rod 10 and is fixedly secured to the sliding tube 53. The slit 57 has a slit 57a in the axial direction of the operating rod 10 and a slit 57b in the circumferential direction of the operating rod 10, the slits forming the approximately L shape together.

As such, when the lock lever 59 is pulled and moved backward in the slit 57a, the sliding tube 53 also moves backward. During the backward movement of the sliding tube 53, the insert portion 55a repeatedly engages with the locking holes 53a to be locked. The lock lever 59, like the cap 35 shown in FIG. 7, can be used for quickly closing the gripping members 11 before the supporting member 15 is pressed to thereby close the gripping members 11.

When the lock lever 59 is pulled and latched by the slit 57b, the sliding tube 53 retracts to thereby lock the gripping members 11 in the closed state. To unlock the gripping members 11, the lock lever 59 may be rotated from the slit 57b to the slit 57a, and at the same time, the rear end of the press pin 55 may be pressed down to pull up the insert portion 55a. The sliding member 13 connected with the sliding tube 53 is pressed toward the front end of the operating rod 10 by the coil spring 30. Therefore, once the engagement between the insert portion 55a and the locking hole 53a is released, the supporting member 15 is restored to thereby open the gripping members 11.

It should be noted that in the embodiments shown in FIGS. 14-16, the restraint unit 2 may have a configuration of any restraint unit of the first through seventh embodiments.

In what follows, the lock unit 3 and the operation unit 4 will be described according to a ninth embodiment of the present invention with reference to FIGS. 17-20. In this embodiment, an operating rod 10A and a sliding member 27A inserted into the operating rod 10A are each configured to be extendable. The operating rod 10A is made up of a first tubular body 61 and a second tubular body 62 into which the first tubular body 61 can be inserted. The sliding member 27A is made up of a first sliding member 64 and a second sliding member 65 inserted therein.

More specifically, the first tubular body 61 has a front end to which a supporting portion 19 is fixedly secured, and a rear end provided with a freely retractable fixing pin 66. The second tubular body 62 for receiving the first tubular body 61 therein has through holes 67 and 68 into which the fixing pin 66 may be inserted. The through hole 67 is provided at the position where the fixing pin 66 can be inserted therein when the first tubular body 61 and the second tubular body 62 are extended. The through hole 68 is provided at the position where the fixing pin 66 can be inserted therein when the first tubular body 61 is retracted into the second tubular body 62.

The first sliding member 64 constituting the sliding member 27A is a tubular body that can receive the second sliding member 65 therein. The first sliding member 64 has its front end fixedly secured to the sliding bar 13, and has its rear end provided with a support ring 69 through which the second sliding member 65 is inserted. The second sliding member 65 is slidably inserted through the support ring 69, and at its front end, a stopper 70 is fixedly secured which prevents the second sliding member 65 from slipping off from the support ring 69. The rear end portion of the second sliding member 65 is slidably inserted through a support ring 71 which is fixedly secured inside the second tubular body 65.

A compressed coil spring 16a is attached on an outer periphery of the first sliding member 64. The compressed coil spring 16a is provided between a locking piece 85, which is fixedly secured on an inner surface of the first tubular body 61, and the sliding bar 13, to bias it toward the restraint unit side.

As apparent from the above description, the operating rod 10A and the sliding member 27A are configured as follows: When the first tubular body 61 and the second tubular body 62 are extended so that the fixing pin 66 is inserted into the through hole 67, the second sliding member 65 of the sliding member 27A is pulled out of the first sliding member 64, whereby the stopper 70 is latched by the support ring 69. When the first tubular body 61 is inserted into the second tubular body 62 and thus the fixing pin 66 is inserted into the through hole 68, the second sliding member 65 is inserted in the first sliding member 64.

In the following, the configurations of a lock unit 3E, an operation unit 4C, and a spring pressure holding unit 5C provided for the operating rod 10A and the sliding member 27A will be described. The lock unit 3E is made up of saw-toothed projections 72 provided on an inner surface of the second tubular body 62, a locking piece 73 to be engaged with the saw-toothed projection 72, and an unlock pin 74 for pressing down the locking piece 73.

The saw-toothed projections 72 may be formed directly on the inner surface of the second tubular body 62, or a cylindrical body having the saw-toothed projections 72 formed on its inner surface may be inserted in the second tubular body 62. The locking piece 73 has a through hole 75 for receiving the unlock pin 74 therein. The locking piece 73 is biased outward by a spring 78 in a slit 77 which is formed in a sliding bar 76 that moves forward and backward inside the second tubular body 62. The second sliding member 65 is fixedly secured to a front end portion of the sliding bar 76, so that the sliding bar 76 and the second sliding member 65 move forward and backward in an integrated manner.

Between the front end surface of the sliding bar 76 and the fixedly secured support ring 71, a pressure spring 79 is attached which biases the sliding bar 76 toward the rear end of the second tubular body 62 (i.e. in the direction opposite to the restraint unit side). The pressure spring 79 is preferably higher in strength than the compressed coil spring 16a described above. In the rear end portion of the sliding bar 76, the slit 77 is formed and, in addition, a pin hole 80 for receiving the unlock pin 74 is formed.

Figure 19:
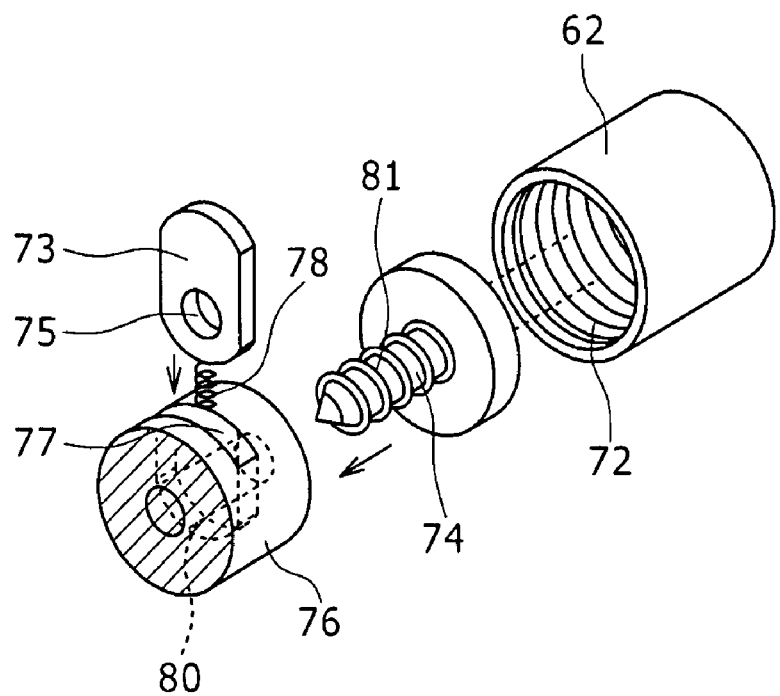
FIG. 19 is a perspective view showing a part of the lock unit in the same device.
Figure 20:
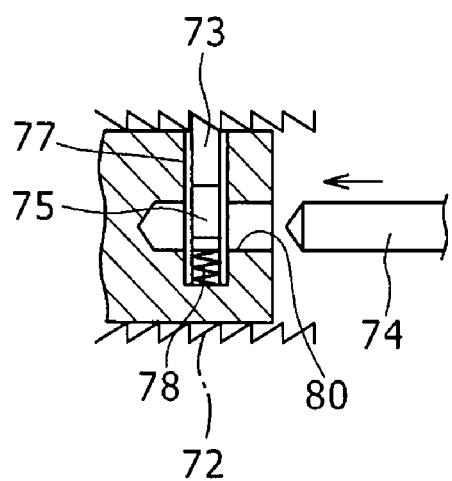
FIG. 20 is a side view showing a part of the lock unit in the same device.

The relationship between the locking piece 73 and the unlock pin 74 will now be described with reference to FIGS. 19-20. In the state where the unlock pin 74 is retracted by a push spring 81, the locking piece 73 is pushed up by the spring 78, and thus, the through hole 75 of the locking piece 73 is misaligned with the pin hole 80 of the sliding bar 76. When the tip end of the unlock pin 74 is inserted into the pin hole 80 and into the through hole 75, the locking piece 73 is pressed down against the spring 78, whereby the through hole 75 and the pin hole 80 are aligned. When the through hole 75 and the pin hole 80 are aligned, the engagement between the locking piece 73 and the saw-toothed projection 72 is released, thereby allowing the sliding bar 76 to move forward and backward.

The unlock pin 74 has a rear end portion fixedly secured to a cap guide bar 82. In the middle part of the unlock pin 74, a spring receiving plate 83 is attached which is configured to slide inside the second tubular body 62, and the push spring 81 is fixedly secured to the spring receiving plate 83. The push spring 81 provided between the spring receiving plate 83 and the sliding bar 76 pushes the unlock pin 74 out of the through hole 75 of the locking piece 73.

Accordingly, when the unlock pin 74 is pushed in, the unlock pin 74 moves forward, together with the spring receiving plate 83, while compressing the push spring 81, whereby the unlock pin 74 is inserted into the through hole 75 of the locking piece 73. As the unlock pin 74 is inserted in the through hole 75, the locking piece 73 is pressed down, so that the locking piece 73 is disengaged from the saw-toothed projection 72. The cap guide bar 82 is inserted in such a manner that it can move back and forth while being guided by a lock nipple 86 that is fixedly secured to the rear end portion of the second tubular body 62.

A locking mechanism assisting the lock unit 3E will now be described in detail. An auxiliary locking mechanism 3F is made up of the lock nipple 86, a lock cap 88, and an elastic member 91. Specifically, the lock nipple 86 is fixedly secured to the second tubular body 62, with its part protruding therefrom. A male thread 87 is formed on an outer peripheral surface of the protruding part of the lock nipple 86. A female thread 89 is formed on an inner peripheral surface of the lock cap 88, so as to be screwed with the male thread 87.

Furthermore, a concave portion 90 is provided on an inner peripheral surface of the lock cap 88, and the elastic member 91 is attached between the concave portion 90 and the lock nipple 86. When the tightening between the lock cap 88 and the lock nipple 86 is loosened, the concave portion 90 is increased in size, so that the pressing force applied by the elastic member 91 to the cap guide bar 82 is released, thereby enabling the cap guide bar 82 to slide smoothly. On the other hand, when the lock cap 88 is tightened up, the elastic member 91 is compressed between the lock cap 88 and the lock nipple 86 to fix the cap guide bar 82 by pressure, thereby locking the forward/backward movement of the cap guide bar 82.

As for the auxiliary locking mechanism 3F, although the engagement between the saw-toothed projection 72 and the locking piece 73 constituting the lock unit 3E can lock the gripping members 11C of the restraint unit 2D in the closed state, if the cap guide bar 82 slides toward the front end (or the restraint unit) side, the unlock pin 74 will release the locked state. Thus, the auxiliary locking mechanism 3F locks the cap guide bar 82, to thereby prevent the unlock pin 74 from pressing down the locking piece 73 in the lock unit 3E. Furthermore, in the case where retraction of the sliding member 27A is insufficient, resulting in insufficient gripping by the gripping members, the cap guide bar 82 can be pulled by a hand, so as to reliably restrain the attacker or the like. These functions are similar to those of the cap 35 shown in FIG. 7 and the lock lever 59 shown in FIG. 16.

Figure 17:
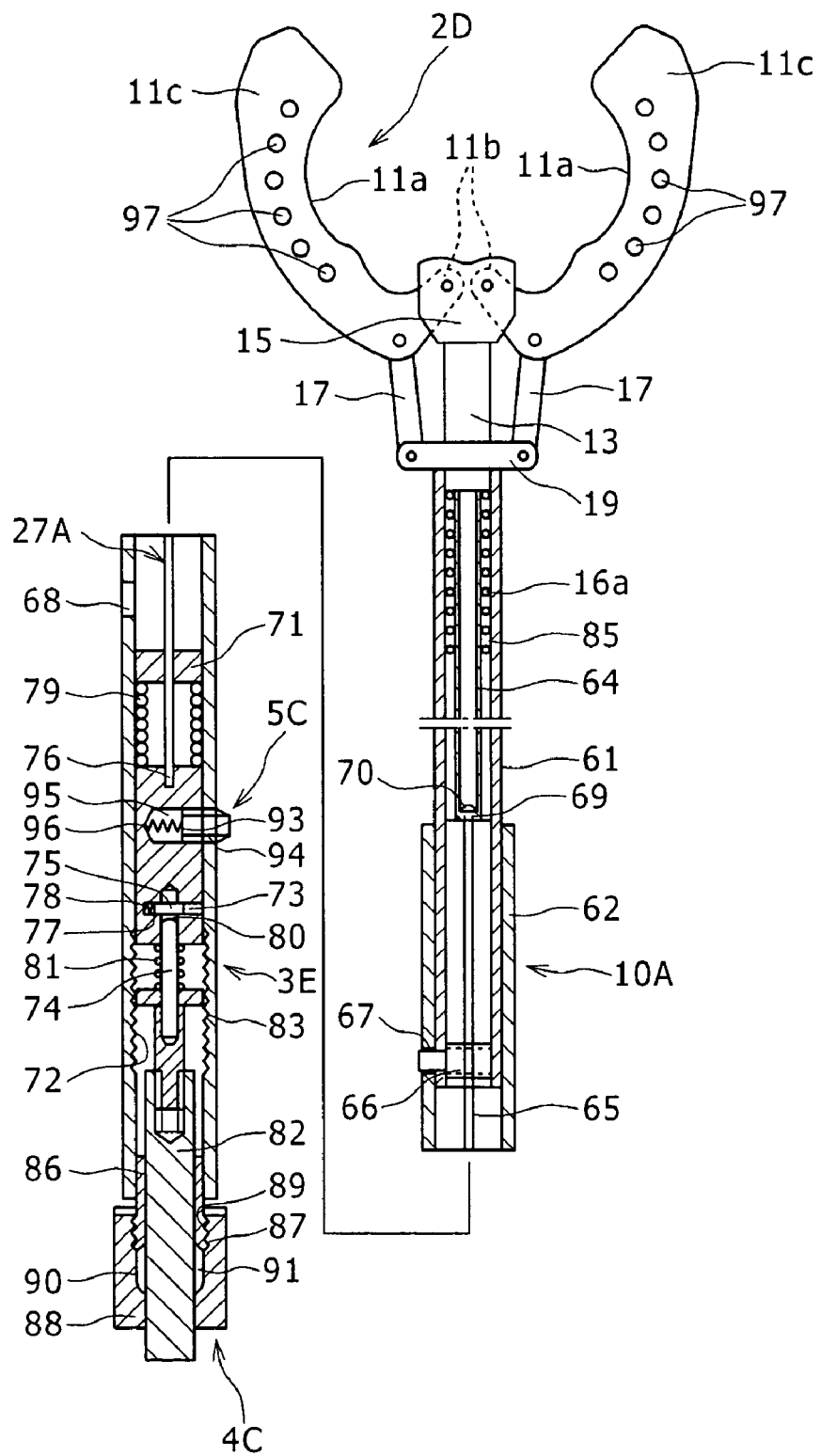
FIG. 17 is a partially sectional plan view of the body device according to an eighth embodiment in the open state.
Figure 18:
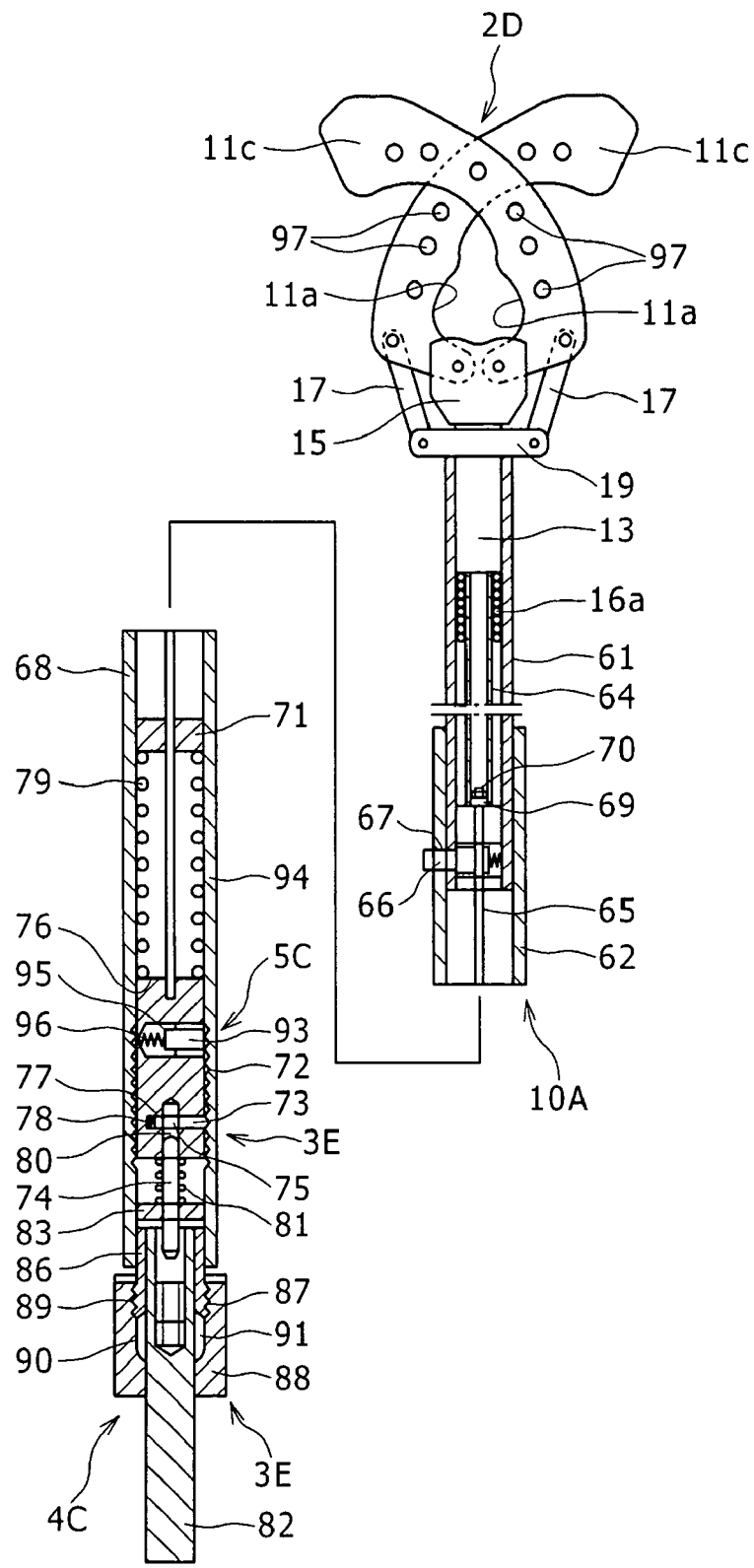
FIG. 18 is a plan view of the same device in the closed state.

The spring pressure holding unit 5C for holding the gripping members 11C in the restraint unit 2D in the open state will now be described. As shown in FIGS. 17-18, the spring pressure holding unit 5C is made up of a fixing pin 93 inserted in the sliding bar 76 and a pin hole 94 formed on the second tubular body 62. The fixing pin 93 is inserted in an insert hole 95 formed in the sliding bar 76 and, with a spring 96 attached to the bottom, the fixing pin 93 is biased outward so that its tip end protrudes from the pin hole 94 on the second tubular body 62. After the engagement between the saw-toothed projection 72 and the locking piece 73 is released, when the supporting member 15 is moved forward, with the pressure coil spring 79 being compressed, to cause the fixing pin 93 to be fitted in the pin hole 94, the gripping members 11C in the restraint unit 2D are held in the open state.

It is noted that a restraint unit 2D in the body restraining device 1 according to the ninth embodiment differs from those in the embodiments shown in FIGS. 1, 6, and 7 in that gripping members 11C, 11C have no guide rollers and that they are provided with a plurality of through holes 97 for the purposes of weight reduction. Otherwise, the configuration is similar to those of the other embodiments, and thus, similar parts are denoted by the same reference characters and description thereof will not be repeated here.

The way of using the body restraining device 1 according to the ninth embodiment will now be described. At the moment in time when an ankle or a wrist of an attacker or the like is inserted between the gripping members 11C, a user may press the operating rod 10A against the same while pressing in the fixing pin 93, which causes the sliding member 27A to retract toward the lock cap 88 side, so that the locking piece 73 engages with the saw-toothed projection 72 to thereby attain the locked state. In case that the hand or the leg may come off from the gripping members 11C, or in order to enhance the tightening, the user may pull the end of the cap guide bar 82.

In the present embodiment, the engagement between the locking piece 73 and the saw-toothed projection 72 is released by inserting the unlock pin 74 into the through hole 75 of the locking piece 73 to thereby press down the locking piece 73. Then, the auxiliary locking mechanism 3F is operated to screw the lock cap 88 firmly to compress the elastic member 91, thereby preventing the cap guide bar 82 from sliding.

Figure 21:
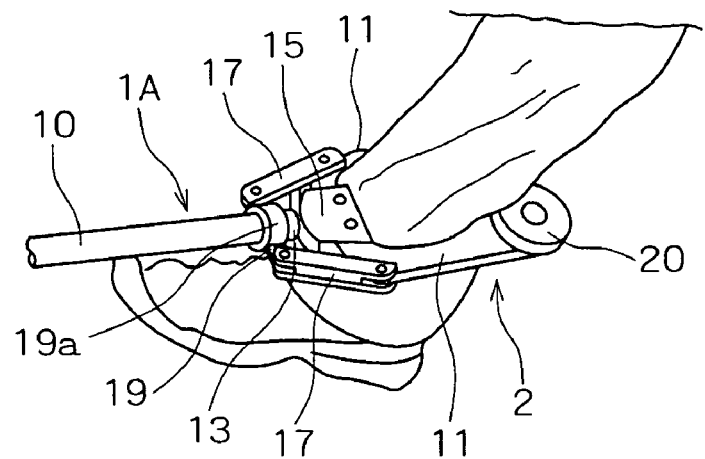
FIG. 21 is a perspective view illustrating the use state where a leg is retrained.

The way of using the body restraining device 1A according to the first embodiment will now be described with reference to FIGS. 21-22. As shown in FIG. 21, at the moment in time when an ankle of an attacker or the like to be arrested is inserted, a user may operate the spring pressure holding unit 5 to release the locked state. In the embodiments shown in FIG. 7 and subsequent figures, a user may operate the operation unit 4 to pull the sliding member 27. Further, in the embodiments shown in FIG. 7 and subsequent figures, when a user presses the device hard against the ankle of the attacker or the like, without operating the operation unit 4, the supporting member 15 is pressed in so as to cause the sliding member 27 to move backward against the coil spring 30, whereby the gripping members 11 are closed.

In each embodiment, when the sliding member 27 retracts, the closed state of the gripping members 11 is held by the lock unit 3 as it is, so that the gripping members 11 can restrain the hand or the leg. The more vigorously the hand or the leg is moved, the more deeply the supporting member 15 is pushed in, causing the gripping members 11 to close more tightly. When the ankle is restrained, the attacker or the like is unable to move the leg and, thus, becomes difficult to keep standing. Then, the user can operate the operating rod 10 to bring the attacker to the ground, to readily apprehend him/her.

Figure 22:
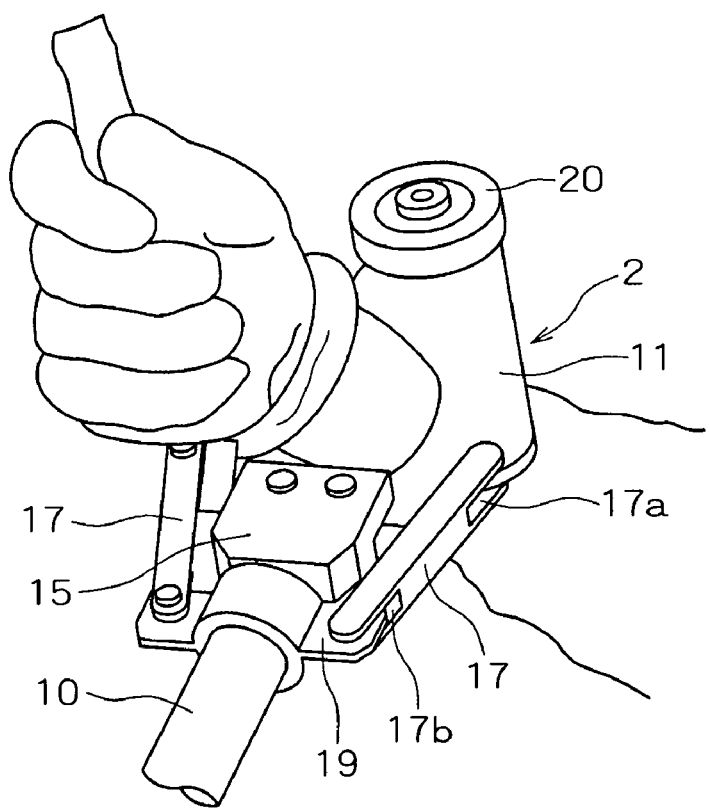
FIG. 22 is a perspective view illustrating the use state where a hand is restrained.

Further, as shown in FIG. 22, a hand of an attacker or the like to be arrested can be restrained with the wrist, as in the case of the ankle. When the gripping members 11 are closed to an extent enough to prevent the wrist from slipping off, the more the attacker moves the hand, the more deeply the supporting member 15 is pushed in for tightening, thereby ensuring the restraint. In the case where the wrist is restrained, even if the attacker or the like holds a deadly weapon like cutlery with the hand, it is possible to cause the attacker to abandon the weapon, whereby the safety of the user him/herself is ensured.

As described above in detail, according to the openable and closable two-pronged body restraining device of the present invention, a hand or a leg of an attacker or the like can be restrained in a moment of time, or while pressing the device against the hand or the leg, in a most effective manner. In addition, the device may be operated with one hand for protection against attacks, like a truncheon, so that the device is useful for self-defense as well.

While the principles of the disclosure have been described above in connection with specific apparatuses and methods, it is to be clearly understood that this description is made only by way of example and not as limitation on the scope of the invention.

The invention claimed is:

1. An openable and closable two-pronged body restraining device comprising:
 a restraint unit provided at one end of an operating rod, wherein the restraint unit comprises a pair of gripping members independent from each other and each having a curved inner surface;
 a lock unit provided at another end within the operating rod, wherein the lock unit comprises:
  a rack-type engagement portion having saw-toothed projections formed on a sliding member attached to a sliding bar, and
  a locking portion having a locking piece to be engaged with the rack-type engagement portion;
 a supporting member being attached to a front end of the sliding bar, which is slidably inserted into the operating rod, wherein the pair of gripping members are attached to the supporting member;
 a pair of swinging plates being attached to respective ends of a supporting portion from one ends and being pivotally attached to the respective pair of gripping members from the other ends, wherein the supporting portion is attached to a front end of said operating rod,
 wherein the supporting member and the sliding bar are pivotally connected to each other and the swinging plates are formed of flexible members so as to cause an angle between the gripping members and the operating rod to be changeable, and
 wherein the lock unit is configured such that when the rack-type engagement portion and the locking piece are engaged with each other, the sliding member is allowed to slide only in a direction toward a rear end of the operating rod causing the supporting member to retract and thereby closing the pair of gripping members.

2. The body restraining device of claim 1 further comprising a spring pressure holding unit for maintaining the pair of gripping members in an open state.

3. The body restraining device of claim 2, wherein the spring pressure holding unit is provided at the other end within the operating rod.

4. The body restraining device of claim 2, wherein the spring pressure holding unit comprises:
 a locking hole formed at a rear end portion of the sliding member;
 a press pin attached to the rear end portion of the operating rod and having an insert pin configured to be inserted into the locking hole;

wherein:
 the press pin is pivotally secured so that the insert pin protruding into the operating rod moves up and down,
 the insert pin is configured to be inserted into the locking hole when the locking piece is disengaged from the saw-toothed projections, and
 the locking hole moves forward to a position of the insert pin while sliding the sliding member and the sliding bar toward the restraint unit.

5. The body restraining device of claim 1, wherein the pair of gripping members each having a guide roller attached to a front end thereof.

6. The body restraining device of claim 1, wherein one of the pair of gripping members is pivotally attached to the supporting member that is coupled to the front end of the sliding bar which is slidably inserted into the operating rod.

7. The body restraining device of claim 1, wherein the pair of gripping members are formed such that their front end portions cross over each other when the gripping members are closed.

8. The body restraining device of claim 7, wherein each of the pair of gripping members further comprising a bent portion in their middle way thereof.

9. The body restraining device of claim 1, wherein in a state where the pair of gripping members are open, the sliding member is biased toward the rear end side of the operating rod by the sliding bar arranged in the operating rod or by a spring attached to the sliding member.

10. The body restraining device of claim 1, wherein the operating rod and the sliding member are configured to be extendable.

11. The body restraining device of claim 1, wherein the sliding member is biased toward the restraint unit side by a spring provided in the operating rod.

12. The body restraining device of claim 11, wherein the operating rod is provided with an operation unit allowing a user to forcibly pull the sliding member toward the rear end side of the operating rod so as to cause the supporting member to retract, thereby closing the gripping members.

13. The body restraining device of claim 1, wherein each of the pair of gripping members further comprising:
 an outer angular portion pivotally attached to one end of corresponding swinging plate; and
 an inner end portions inserted into a corresponding concave portion of the supporting member.

14. An openable and closable two-pronged body restraining device comprising:
 an operating rod;
 a restraint unit provided at a front end of the operating rod, wherein the restraint unit comprises:
  a pair of gripping members independent from each other and each having a curved inner surface;
  guide rollers provided at front ends of the pair of gripping members;
  backstops for allowing the guide rollers to rotate only inwardly;
  a supporting member to which rear ends of the pair of gripping members are pivotally attached;
  a sliding bar slidably inserted into the operating rod, wherein a front end of the sliding bar being coupled to the supporting member;
  a supporting element fixed at the front end of the operating rod, wherein the sliding bar is passing through the supporting element; and
  a pair of swinging plates being pivotally attached to respective ends of said supporting element at one ends, while at the other ends is pivotally attached to the pair of gripping members;

a lock unit provided at a place in the operating rod that is closer to a rear end of the operating rod than the place where the restraint unit is provided, wherein the lock unit comprises:
  a sliding member coupled to the sliding bar;
  a rack-type engagement portion having saw-toothed projections formed on the sliding member, wherein one side of the saw-toothed projections is perpendicular to the sliding member while the other side of the saw-toothed projections is oblique to the sliding member;
  a locking portion having a locking piece to be engaged with the rack-type engagement portion, wherein one side of the locking piece is perpendicular to the sliding member while the other side of the locking piece is oblique to the sliding member; and
  a pressing member for engaging and releasing the locking engagement of the rack-type engagement portion and the locking portion with each other;

a compression coil spring provided around the sliding bar or the sliding member, wherein the compression coil spring biases the sliding bar or the sliding member so that the compression coil spring presses the sliding bar or the sliding member toward the rear end of the operating rod; and a spring pressure holding unit for maintaining the bias force of the compression coil spring, wherein the spring pressure holding unit comprises:
  a locking hole formed on the sliding member; and
  an insert pin configured to be inserted into and pulled out from the locking hole, wherein when the insert pin is inserted into the locking hole, the sliding member or the sliding bar is prevented from sliding so as to maintain the compression coil spring in a compressed state, thereby maintaining the pair of gripping members in an open state, wherein when the insert pin is pulled out from the locking hole, the compression coil spring expands and moves the sliding bar or the sliding member toward the rear end of the operating rod, thereby closing the pair of gripping members, and wherein when the sliding bar or the sliding member is moved toward the front end of the operating rod, the compression coil spring is compressed and the insert pin is inserted into the locking hole to open the pair of gripping members.

15. The body restraining device of claim 14, wherein the pair of gripping members are formed such that their front end portions cross over each other when the gripping members are closed.

16. The body restraining device of claim 15, wherein each of the pair of gripping members further comprising a bent portion in their middle way thereof.

17. An openable and closable two-pronged body restraining device comprising:
  an operating rod;
  a restraint unit provided at a front end of the operating rod, wherein the restraint unit comprises:
    a pair of gripping members independent from each other and each having a curved inner surface;
    guide rollers provided at front ends of the pair of gripping members;
    backstops for allowing the guide rollers to rotate only inwardly;
    a supporting member to which rear ends of the pair of gripping members are pivotally attached;
    a sliding bar slidably inserted into the operating rod, wherein a front end of the sliding bar being coupled to the supporting member;
    a supporting element fixed at the front end of the operating rod, wherein the sliding bar is passing through the supporting element; and
    a pair of swinging plates being pivotally attached to respective ends of said supporting element at one ends, while at the other ends is pivotally attached to the pair of gripping members;

a lock unit provided at a place in the operating rod that is closer to a rear end of the operating rod than the place where the restraint unit is provided, wherein the lock unit comprises:
  a sliding member coupled to the sliding bar;
  a rack-type engagement portion having saw-toothed projections formed on the sliding member, wherein each of the saw-toothed projections have an inclined plane only on one side with respect to the sliding member;
  a locking portion having a locking piece to be engaged with the rack-type engagement portion, wherein the locking piece has an inclined plane only on one side with respect to the sliding member; and
  a pressing member for engaging and releasing the locking engagement of the rack-type engagement portion and the locking portion with each other;

a tension spring provided at a place in the operating rod that is closer to the rear end of the operating rod than the place where the sliding member is provided, wherein the tension spring biases the sliding bar or the sliding member so that the tension spring pulls the sliding bar or the sliding member toward the rear end of the operating rod; and a spring pressure holding unit for maintaining the bias force of the tension spring, wherein the spring pressure holding unit comprises:
  a locking hole formed on the sliding member; and
  an insert pin configured to be inserted into and pulled out from the locking hole, wherein when the insert pin is inserted into the locking hole, the sliding member or the sliding bar is prevented from sliding so as to maintain the tension spring in an expanded state, thereby maintaining the pair of gripping members in an open state;

wherein when the insert pin is pulled out from the locking hole, the tension spring compresses and moves the sliding bar or the sliding member toward the rear end of the operating rod, thereby closing the pair of gripping members, and wherein when the sliding bar or the sliding member is moved toward the front end of the operating rod, the tension spring is expanded and the insert pin is inserted into the locking hole to open the pair of gripping members.

18. The body restraining device of claim 17, wherein the tension spring comprises a spiral spring arranged inside a cap, which is fitted into a rear end surface of the operating rod.

19. The body restraining device of claim 18, wherein a front end of the spiral spring is attached to the sliding member.

20. The body restraining device of claim 17, wherein the tension spring comprises a tension coil spring arranged inside a cap, which is fitted into a rear end surface of the operating rod.

* * * * *